(12) United States Patent
Zohrabyan et al.

(10) Patent No.: US 8,994,915 B2
(45) Date of Patent: Mar. 31, 2015

(54) MULTIPLE CELL LIQUID CRYSTAL OPTICAL DEVICE WITH COUPLED ELECTRIC FIELD CONTROL

(75) Inventors: Armen Zohrabyan, Québec (CA); Karen Asatryan, Québec (CA); Tigran Galstian, Québec (CA); Vladimir Presniakov, Québec (CA); Amir Tork, Québec (CA); Aram Bagramyan, Québec (CA)

(73) Assignee: LensVector Inc., Sunnyvale, CA (US)

( * ) Notice: Subject to any disclaimer, the term of this patent is extended or adjusted under 35 U.S.C. 154(b) by 262 days.

(21) Appl. No.: 13/360,648

(22) Filed: Jan. 27, 2012

(65) Prior Publication Data

US 2012/0188490 A1    Jul. 26, 2012

Related U.S. Application Data

(63) Continuation-in-part of application No. PCT/CA2011/050783, filed on Dec. 19, 2011.

(60) Provisional application No. 61/424,115, filed on Dec. 17, 2010.

(51) Int. Cl.
*G02F 1/13* (2006.01)
*G02F 1/1347* (2006.01)
*G02F 1/1343* (2006.01)
*G02F 1/29* (2006.01)

(52) U.S. Cl.
CPC ........ *G02F 1/1347* (2013.01); *G02F 1/134309* (2013.01); *G02F 2001/294* (2013.01)
USPC .............................. 349/200; 349/74; 349/122

(58) Field of Classification Search
None
See application file for complete search history.

(56) References Cited

U.S. PATENT DOCUMENTS

| | | |
|---|---|---|
| 4,922,182 A | 5/1990 | Cox |
| 2009/0166426 A1 | 7/2009 | Giebel et al. |
| 2011/0090415 A1 | 4/2011 | Asatryan et al. |
| 2011/0109824 A1 | 5/2011 | Galstian |
| 2011/0216257 A1 | 9/2011 | Galstian et al. |
| 2012/0019761 A1 | 1/2012 | Nystrom et al. |

FOREIGN PATENT DOCUMENTS

| | | |
|---|---|---|
| WO | WO 2009/146530 A1 | 12/2009 |
| WO | WO 2009/153764 A2 | 12/2009 |

OTHER PUBLICATIONS

PCT/CA2011/050783 International preliminary report with related claims 1-23.

(Continued)

*Primary Examiner* — Richard Kim
(74) *Attorney, Agent, or Firm* — Anglehart et al.

(57) ABSTRACT

A liquid crystal optical device is provided. The optical device includes a liquid crystal cell controlling optical properties of light passing therethrough and has: a liquid crystal layer, a planar electrode located to one side of said liquid crystal layer; an electric field control structure located to the opposite side of the liquid crystal layer; and a wavefront adjustment structure configured to provide optical phase front adjustment. In some embodiments the wavefront adjustment structure is a conductive floating electrode. In other embodiments the wavefront adjustment structure is a weakly conductive structure having spatially variable sheet resistance. In other embodiments the wavefront adjustment structure a weakly conductive structure having spatially variable sheet resistance having a frequency dependent characteristic.

27 Claims, 21 Drawing Sheets

(56) References Cited

OTHER PUBLICATIONS

A.F. Naumov et al., Control optimization of spherical modal liquid crystal lenses, Optics Express, pp. 344-352, Apr. 26, 1999, vol. 4, No. 9.

A.F. Naumov et al., Liquid-Crystal Adaptive Lenses with Modal Control, Optics Letters, pp. 992-994, Jul. 1, 1998, vol. 23, No. 13, Optical Society of America.

PCT/CA2011/050583 International search report.

PCT/CA2011/050783 International search report.

Australia patent application 2012203697 office action dated Sep. 23, 2014 with related claims.

US 8,994,915 B2

MULTIPLE CELL LIQUID CRYSTAL OPTICAL DEVICE WITH COUPLED ELECTRIC FIELD CONTROL

RELATED APPLICATIONS

This application is a continuation-in-part of PCT/CA2011/050783 filed Dec. 19, 2011, designating the United States, which claims priority of U.S. Provisional Patent Application Ser. No. 61/424,115 entitled "Multiple Cell Liquid Crystal Optical Device with Coupled Electric Field Control" and filed 17 Dec. 2010, the entirety of which is incorporated herein by reference.

TECHNICAL FIELD

The present invention relates to liquid crystal optical devices and to their control electrodes.

BACKGROUND

Liquid Crystal (LC) lenses and other liquid crystal optical devices are known in the art. One geometry is a planar construction in which a liquid crystal is held in a cell between glass or plastic plates. An electrically variable gradient index (so called GRIN) lens can be formed by controlling the relative orientation of the liquid crystal molecules to create a spatial variation of the index of refraction of the liquid crystal material within an aperture of the device. In this way, good optical lens power can be achieved within a relatively small thickness.

A variety of liquid crystal lens designs have been proposed that control the orientation of the liquid crystal molecules in response to an electric field. Most LC lens designs spatially modulate an electric field acting on the liquid crystal layer to create a resulting GRIN lens. In this area, a few approaches have been taken. Using relatively large voltages, it has been shown that a ring electrode placed at a distance above a liquid crystal cell under which a planar electrode is located can provide a GRIN lens. In an article published by A. F. Naumov et al., entitled "Liquid-Crystal Adaptive Lenses with Modal Control", OPTICS LETTERS/Vol. 23, No. 13/Jul. 1, 1998, a lens such as that shown in FIG. 1 uses an LC layer 10 positioned between a hole patterned electrode 14 located adjacent to a top glass substrate 11, and a planar, optically transparent, electrode 12 of indium tin oxide located adjacent to a bottom glass substrate 16. Liquid crystal alignment layers 18 are located to either side of the LC layer 10. Because this prior art lens uses a single LC layer 10, the lens will be polarization dependent.

The principle of operation of the lens of FIG. 1 is the attenuation of the electrical potential, and corresponding drop in electric field strength across (in) the LC layer, between the periphery of the lens, where the hole patterned electrode 14 is located, and the center of the lens. Since the typical thickness of an LC layer 10 is about 0.05 mm, and the typical optical apertures of interest are about 2 mm, i.e. forty times larger, the radial drop in electric field strength across the LC layer 10 is drastic. For this reason, a high resistivity (or weakly conductive) layer 19 is deposited in the central part of the hole patterned electrode 14. The high resistivity layer 19 "softens" the drop in electric field according to the attenuation of electrical signals by the distributed RC circuitry formed by the high resistivity layer 19 and the rest of the system (where the resistance is provided mainly by the high resistivity layer 19 and the capacitance is provided mainly by the LC layer 10).

The GRIN lens of FIG. 1 is known to have some good properties, but suffers from some significant drawbacks. In particular, the operation of the lens is extremely sensitive to the geometrical and material parameters of the layered structure. The most important of these is the sheet resistance Rs of the high resistivity layer 19, which is defined by $R=(d\sigma)^{-1}$, where d is the thickness of the high resistivity layer 19 and $\sigma$ is its conductivity. This complicates greatly the fabrication of a polarization independent tunable liquid crystal lens (TLCL) based on this technology:

A liquid crystal lens layer will focus a single polarization of light and leave the other polarization essentially unaffected: the liquid crystal being a birefringent material, the light leaving the LC lens is structured into two polarizations. Natural light (obtained from sun or a lamp) contains a chaotic mixture of polarizations, and it is therefore desirable to use at least two liquid crystal layers each of which acts on a different (orthogonal) polarization direction so that all the light (all polarizations) is focused in the same way. A conventional approach uses a simple combination of two LC lenses, each having molecular orientations in mutually orthogonal planes. Thus, two planar liquid crystal lenses, each acting on a different polarization, are arranged with the intention that they will focus light onto a common focal plane. In practice however, the ability to create different "polarization" LC lenses having identical optical properties with respect to the image sensor is a challenge. A lens design that is too thick, with a large spacing between two liquid crystal layers, results in a large spacing between focal planes of different polarization components, and fails to create a clear image in natural light, due to each polarization component being focused in different way. In addition, when the lens shape and/or optical power of the two lenses are not identical, the effect of each lens is different even if the LC layers are positioned relative close to each other. This difference may arise because of differences in LC thicknesses or the sheet resistance values for two layers 19 of lenses which must be combined to allow polarization independent operation. While the thickness of the LC layers may be somewhat controlled by spacers, control of the sheet resistance is a much more difficult task (FIG. 3):

In wafer-scale manufacturing, a wafer is produced containing a large number of LC cells, and two such wafers are bonded together to make polarization independent LC optical devices. However, for such wafer fabricated lenses to have an identical optical power and lens shape (when the two wafers are bonded to each other), the two wafers must have the same properties.

In the case of a ring electrode which uses a highly resistive layer 19 of material placed near the aperture, the electrical sheet resistance Rs of the material plays an important role in defining the electrode and lensing properties. Controlling the resistance of a thin layer of material on a wafer within a required range for lensing operation is a challenge, and those resistive properties are very important to frequency control of the electrode.

One solution is proposed in PCT Patent Application WO/2009/153764 which describes two orthogonally oriented liquid crystal layers arranged, respectively, above and below a common, middle ring electrode, which is coated by a single high resistivity material used to control both LC layers. The single middle electrode is intended to provide a spatially modulated electric field for both the upper LC layer and the lower LC layer with each of the two layers acting on a different polarization direction of light. It is proven that, in this case, the two lenses image natural light in a substantially similar way onto the same imaging plane or image sensor. The spatial profile of the electric field (and thus the optical power)

was shown to be the same for both the upper and lower layers. In manufacturing, the lower LC layer has the middle electrode placed on top of it (FIG. 2), and the upper LC layer is either fabricated on top of the middle electrode or separately fabricated and then bonded to the lower LC layer/middle electrode combination. When wafer-scale manufacturing a middle electrode arrangement, a small difference in position between the middle electrode and each LC cell can create a large discrepancy in the optical properties of each lens.

SUMMARY

In accordance with the proposed solution (FIG. 4), a liquid crystal optical device is provided that makes use of an electric field which is influenced by an electrical coupling effect of two closely positioned weakly conductive layers to reduce the effect of the mismatch between their sheet resistances. A first LC cell is provided having an LC layer, a planar electrode on a first side of the LC layer and a hole patterned electrode on a second side of the LC layer, opposite the first. The first LC cell also includes a weakly conductive layer adjacent to the hole patterned electrode. A second LC cell is also provided which has an LC layer, and a planar electrode and a hole patterned electrode positioned, respectively, to either side of the LC layer (in reverse order with respect to that of the first LC cell). The second LC cell also has a weakly conductive layer adjacent to the hole patterned electrode of that cell. In an exemplary embodiment of the invention, the two cells are such that the weakly conductive layer of each cell is positioned such that a single electric field generated by one or more of the electrodes of the device is influenced by both weakly conductive layers. For example, the first weakly conductive layer and the second weakly conductive layer are one of: located in contact with each other; and separated between one of: a substrate having a high dielectric constant, and a substrate having a limited, diminished, selectively insulated, etc. conductivity.

In one embodiment, the two weakly conductive layers have distinctly different sheet resistance values, and the collective effect of the two layers on the electric field in both LC layers is equivalent to the effect that a single weakly conductive layer would have if its sheet resistance was a value in between the sheet resistances of the two weakly conductive layers of the device. Depending on the values of the individual sheet resistances, this effective value can be close to an average of those two sheet resistance values (FIG. 3). Thus, two weakly conductive layers can be selected to have a combined effect even if each of them has a distinctly different sheet resistance. In this way, manufacturing tolerances for the weakly conductive layers need not be too strict.

In one particular embodiment, the liquid crystal optical device is a tunable liquid crystal lens having two LC cells, each with a weakly conductive layer. A ring electrode of the first cell couples with its own weakly conductive layer, but also with that of the second cell (which may also, optionally, have a ring electrode) if the two weakly conductive layers are closer than a critical distance (FIG. 5). A critical distance for this "coupling" effect is smaller if a difference between the sheet resistances of the two weakly conductive layers is higher. However, if the distance between the weakly conductive layers is less than the critical distance, the coupling effect provides that the electric field distribution will be substantially the same for the two LC cells. The effective sheet resistance value of the "coupled" common layer will be a value between the individual sheet resistance values of the two weakly conductive layers (FIG. 3).

The ability to combine the effect of two weakly conductive layers can increase the yield of wafer manufacturing of LC devices by allowing the use of wafers having layers with sheet resistances (thickness or conductivity properties) that vary from a desired tolerance range, since they can be used in combined devices, such as those of the proposed solution, to create an effective layer with properties close to the desired value.

In another embodiment of the proposed solution, a weakly conductive material is used as part of a middle electrode structure to allow for common control of two LC layers of different polarizations. The middle electrode can be a hole patterned electrode that can form an electric field in conjunction with a planar electrode located at an opposite side of the cell. The second LC cell may have no hole patterned electrode but, rather, only a uniform planar electrode on a side of the LC layer of the second cell opposite the first LC cell. With proper positioning of the hole patterned electrode and appropriate spacing between the two cells, the hole patterned electrode of the first LC cell can also establish a desired electric field in conjunction with the planar electrode of the second LC cell. Thus, a single control signal can be used to simultaneously control both LC cells. This can be particularly desirable if the two LC cells control orthogonal polarizations of light in the same manner, and together form a polarization independent liquid crystal device. A suitable spacing between the two LC cells can be established, for example, by using spacer elements, such as spacer beads, and the space can be maintained as the two LC cells are bonded together.

In yet another embodiment of the proposed solution, each of two LC cells have a planar electrode, a hole patterned electrode and a weakly conductive layer, and the two cells share a common substrate located between the first liquid crystal layer and the second liquid crystal layer. In this embodiment, the weakly conductive layers of each of the two LC cells can be located on the common substrate at a predetermined distance from each other. The hole patterned electrode of each of the two LC cells can also be located on the common substrate. In a variation of this embodiment, the common substrate itself can be made of a weakly conductive material and can function as the weakly conductive layers. The weakly conductive layers can also be discrete layers located on a common substrate that is also made of a weakly conductive material. Manufacturing the common substrate can include separate fabrication of two substrates, each corresponding to each LC cell, which are attached together to form the common substrate.

In addition to the above identified problems with the prior art, it has been realized that the drastic radial drop in electric field strength across the LC layer causes departures from a desired (e.g., spherical or other) wavefront. TLCLs employing a weakly conductive material layer, subject incident light to an aspherical wavefront which tends to have a flattened top and a Gaussian-like drop-off at least for certain optical power ranges. It has been discovered that a floating non-connected (FIG. 15) electrode can be used to reshape the wavefront otherwise generated by a hole patterned electrode and weakly conductive layer combination. Depending on layered structure geometry and material properties, at least one of a disc, ring and donut shaped floating electrode can be employed to reshape the wavefront otherwise generated by a hole patterned electrode and weakly conductive layer combination towards a spherical wavefront.

In accordance with one aspect of the proposed solution, a liquid crystal optical device is provided comprising: a liquid crystal cell controlling optical properties of light passing therethrough, said liquid crystal cell having a liquid crystal layer; a planar electrode located to a first side of said liquid crystal layer; an electric field control structure located to a second side of said liquid crystal layer opposite said first side of said liquid crystal layer; and a wavefront adjustment structure configured to provide optical phase front adjustment. In some embodiments the wavefront adjustment structure is a conductive floating electrode, in other embodiments the wavefront adjustment structure is a weakly conductive structure having spatially variable sheet resistance.

In accordance with another aspect of the proposed solution, there is provided a liquid crystal optical device of the type having at least one liquid crystal layer provided between substrates bearing alignment layers, and a hole-patterned electrode arrangement with a weakly conductive material within an aperture of the arrangement to provide a spatially modulated electric field, characterized in that the hole-patterned electrode arrangement is structured to change a phase front in the liquid crystal layer by having one or more of: a floating electrode structure external to the electrode arrangement over the aperture; and a spatially non-uniform layer of weakly conductive material.

In accordance with yet another aspect of the proposed solution, there is provided method of manufacturing a liquid crystal optical device, the method comprising: fabricating a plurality of liquid crystal cells each having a planar electrode, a hole patterned electrode and a weakly conductive layer; and arranging said liquid crystal cells relative to each other such that an effective single electric field generated by one or more of the electrodes of said device is influenced by each of the weakly conductive layers.

BRIEF DESCRIPTION OF THE DRAWINGS

The invention will be better understood by way of the following detailed description of embodiments of the invention with reference to the appended drawings, in which.

DETAILED DESCRIPTION

Coupled Optical Device Structure and Operation

Figure 1:
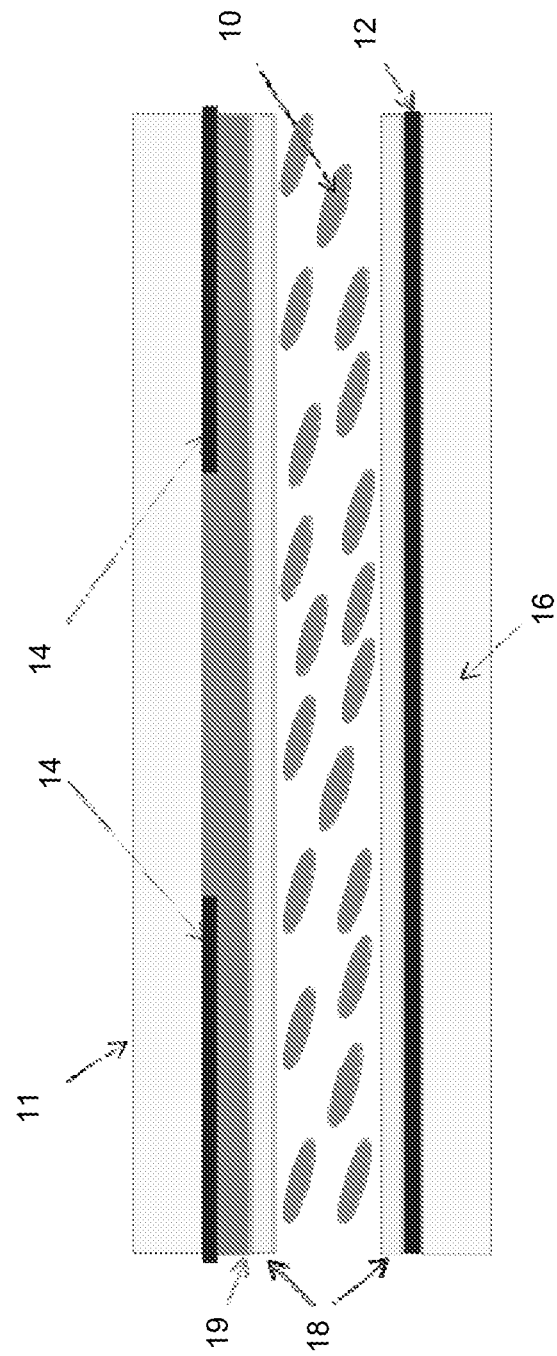
FIG. 1 is a schematic representation of a prior art liquid crystal lens using a hole-patterned electrode with "modal control"
Figure 2:
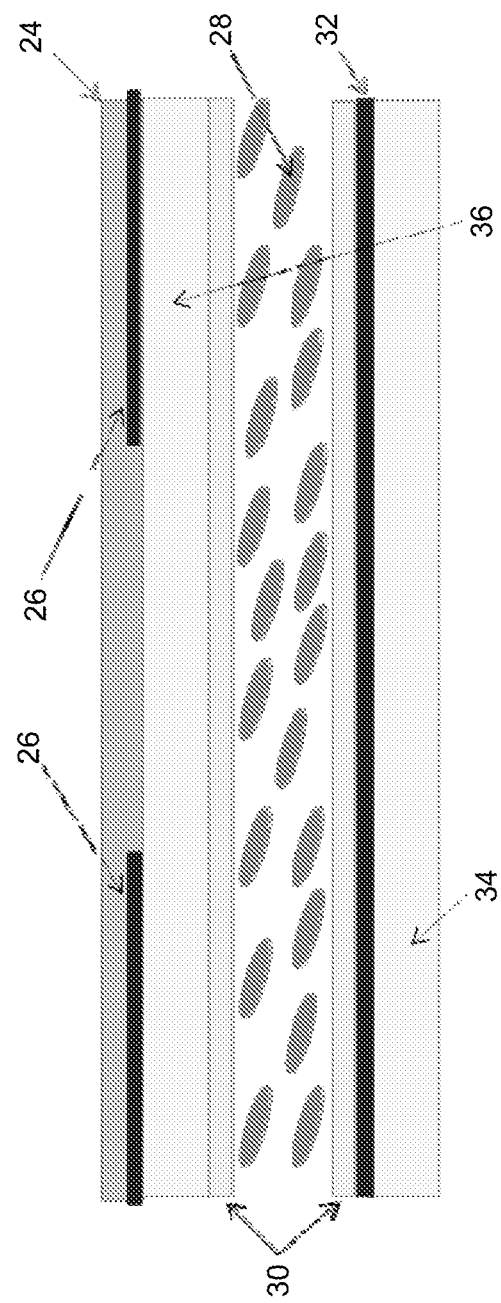
FIG. 2 is a schematic representation of a polarization dependent liquid crystal lens, in accordance with the proposed solution, having a hole patterned electrode on top of a top substrate of the cell with weakly conductive layer applied over the hole-patterned electrode.

In commonly-assigned international patent application PCT/IB2009/052658, the specification of which is hereby incorporated by reference, a Tuneable Liquid Crystal Lens (TLCL) is disclosed for which an electric field created by a ring electrode placed close to a uniform electrode is shaped in a desired manner. In accordance with the proposed solution, a configuration illustrated in cross-section in FIG. 2 presents a similar arrangement using a Weakly Conductive Layer (WCL) 24 positioned near an external surface of the layered structure and adjacent to (preferably in contact with and on the top of) a hole patterned electrode 26. This specific position enables the lens structure to be used together with a second cell in such a way that the effects of the WCL 24 and a WCL of the second cell are coupled together. The two cells together can then be used to form a polarization independent lens (capable of focusing unpolarized light) driven by a single electrical driver.

The embodiment illustrated in FIG. 2 has an LC layer 28 located between two liquid crystal alignment layers 30, as is known in the art. A bottom optically transparent conductive layer 32 is located between one of the alignment layers 30 and a bottom substrate 34. A top substrate 36 separates one of the alignment layers 30 from the hole patterned electrode 26. With the WCL 24 located adjacent to the top of the hole patterned electrode 26, this TLCL cell is well-suited to being combined with another similar cell.

The WCL 24, to have the desired properties relating to electric field shaping while allowing for the cell to be thin and operational at low voltage, uses a high electrical resistivity material having properties between those of a semiconductor and those of a dielectric. The material characteristics are in a range for which the fundamental mechanisms of material conductivity (and polarizability) suffer drastic transitions (sometimes called the percolation zone). This percolation zone is a range where layer conductivity could drastically change with small changes in the WCL material's volume morphological structure/geometry, which severely limits the repeatability in manufacturing WCLs of this type. In the silicon semiconductor industry, control efficiency of sheet resistance is still in the order of ±10%, and even less accurate for emerging technology using indium phosphide.

Figure 3:
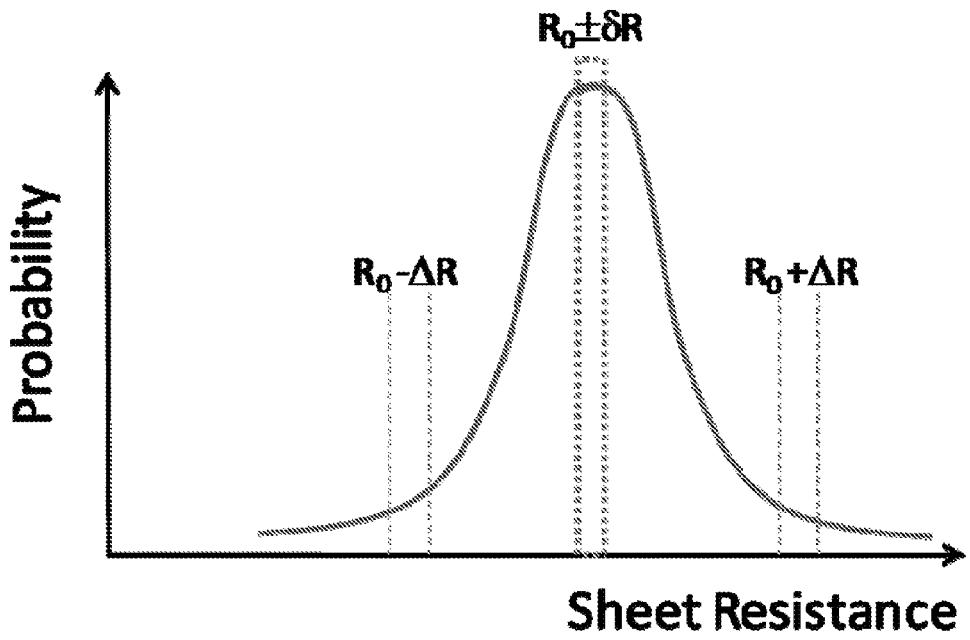
FIG. 3 is a graphical representation of a histogram distribution of typical sheet resistances of weakly conductive layers.

For the WCL 24 shown in FIG. 2 to have a material composition, morphology and sheet thickness that provides the desired conductivity properties (sheet resistance) is thus a challenge using conventional deposition technology. As illustrated schematically in FIG. 3, the conductive properties of the deposited layer of WCL material will vary from wafer to wafer with a rather large distribution. For circuitry intended to control the lens operation with a predetermined range of frequencies, the range of acceptable sheet resistances is limited to a nominal sheet resistance of $R_0$ with a very small tolerance of $\pm\delta R$ (indicated in FIG. 3 by broken lines).

Figure 4:
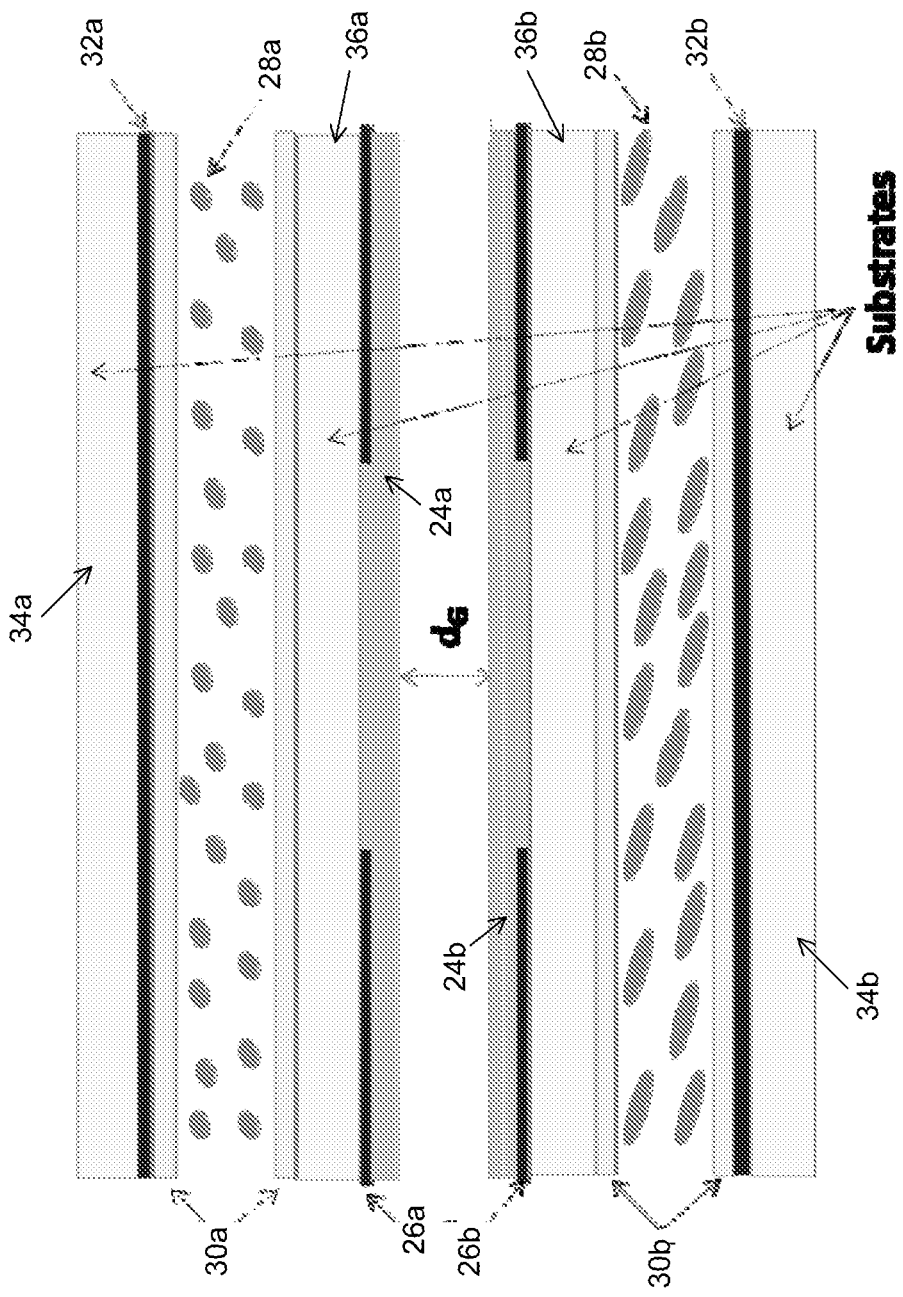
FIG. 4 is a schematic representation of a polarization independent liquid crystal lens which combines two of the cells of FIG. 2 arranged with alignment layers at 90 degrees to each other and the weakly conductive layers having a sufficiently small gap to be coupled.

Illustrated in FIG. 4 is an embodiment in which two TLCL cells, such as those illustrated in FIG. 2, are joined together in a way that the effect of the WCLs of the two layers is electrically coupled. This coupling or "synchronization" of two WCLs allows them to function as one effective control layer for the cross-oriented TLCLs. While this combination of two layers illustrates the presence of two hole patterned electrodes 26a and 26b, the use of two such electrodes is optional, and a single hole patterned electrode can be sufficient for a "coupled" operation.

In the configuration of FIG. 4, a first cell includes an LC layer 28a located between two alignment layers 30a. Adjacent to one of the alignment layers 30a is an optically transparent planar electrode layer 32a which is supported by substrate 34a. The other alignment layer 30a is located between the LC layer 28a and substrate 36a, to the other side of which is hole patterned electrode 26a and WCL 24a. A second TLCL of the structure illustrated in FIG. 4 is essentially the same as the first, however having its liquid crystal molecules oriented to focus a polarization of light perpendicular to that of the first cell. The LC layer 28b of this cell is located between two alignment layers 30b, a first of which is located adjacent to optically transparent planar electrode 32b and substrate 34b. The other alignment layer 30b separates the LC layer 28b from substrate 36b, which lies adjacent to hole patterned electrode 26b and WCL 24b. A separation between the WCLs 24a and 24b is indicated in the figure as being a distance $d_G$.

As mentioned above, the manufacturing of resistive layers with precise sheet resistances is difficult, which limits the efficient production of single cell TLCLs. In accordance with the proposed solution, however, a dual cell system like the one illustrated in FIG. 4 makes use of two different WCLs, the effects of which are coupled together. In such a case, two WCLs that would each be out of the normal tolerance range for use with a single cell structure can be used together in a two cell configuration if their combined sheet resistance meets the tolerance requirement. Thus, referring again to FIG. 3, two WCLs having respective sheet resistances of approximately $R_0 - \Delta R$ and $R_0 + \Delta R$ can be combined to form an effective WCL having a sheet resistance near $R_0$. This allows a much greater portion of the TLCL production to be used, and permits selection of single TLCL pairs to create a combined WCL sheet resistance that is very close to a desired nominal $R_0$ value.

Prior art polarization independent TLCLs are typically a combination of two conventional single-cell TLCLs. However, there is no WCL coupling in such prior art structures. In the embodiment illustrated in FIG. 4, however, the WCL of each cell is in close proximity to, and can be in contact with, the WCL of the other cell. In this case, the coupling effect between the WCLs is dependent on their relative separation and the dielectric constant of the gap material in between. In particular, as the size of the gap between the WCLs increases, so does the differential optical power between the lenses. This relationship is illustrated graphically in FIG. 5, which plots the gap between the two WCLs against the difference in voltage at the center of each TLCL of the pair for a number of different samples, each having a different ratio between the sheet resistances of the two WCL layers. For equal sheet resistances (i.e., $R_2/R_1=1$) the voltage difference for the two lenses is zero regardless of the gap between the WCLs. However, for higher differences between the sheet resistances, the rate of increase in voltage difference with a gap increase is more rapid.

Figure 5:
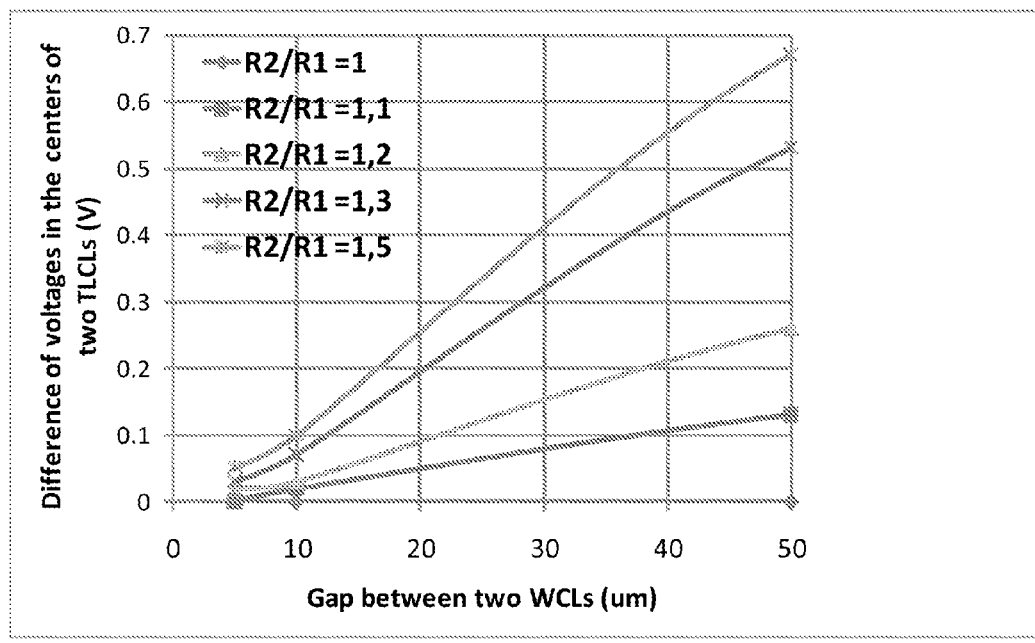
FIG. 5 is a graphical representation of center voltage difference upon the gap size between the two Weakly Conductive Layers (WCLs) of a device having two "half" Tunable Liquid Crystal Lenses (TLCLs) for a variety of different WCL pair combinations.
Figure 6:
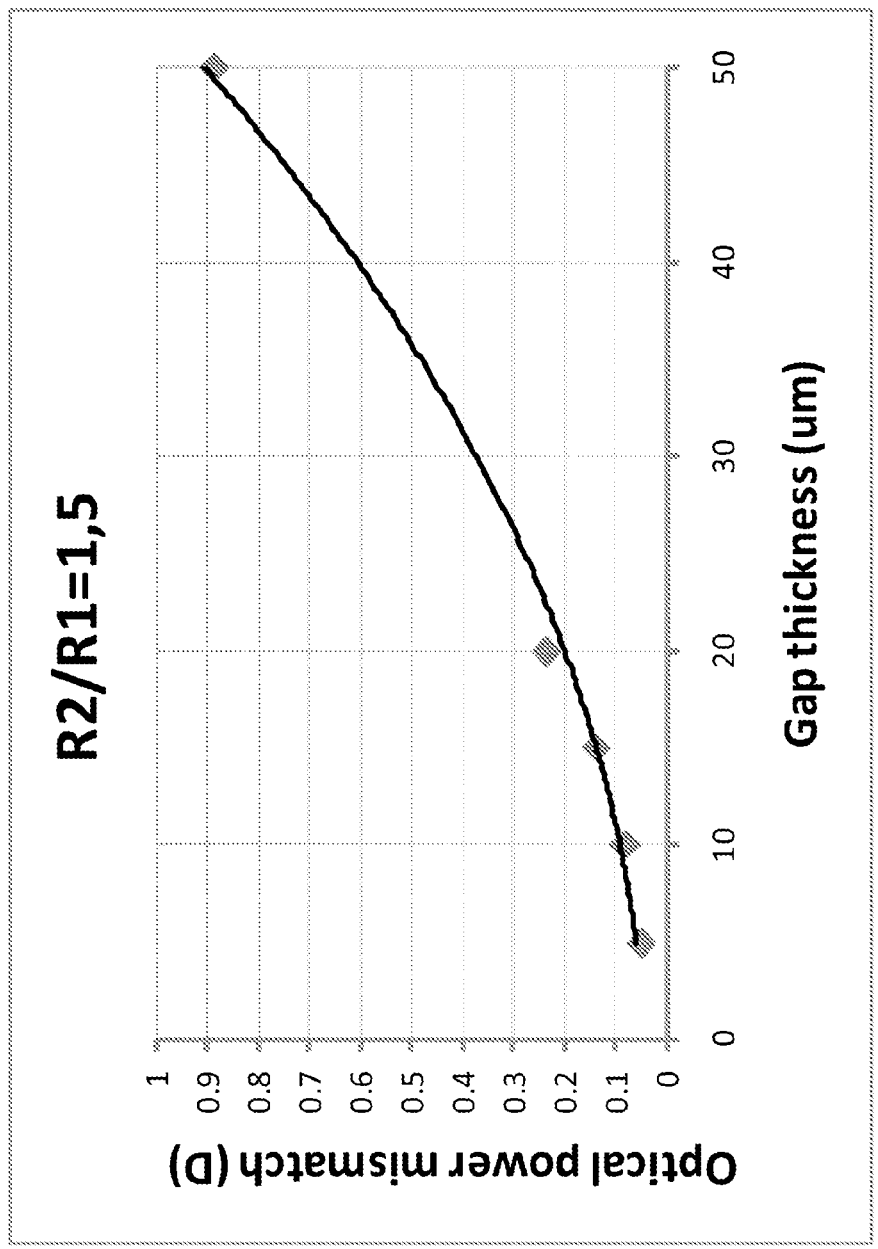
FIG. 6 is a graphical representation of a variation in optical power mismatch between two "half" TLCLs of a coupled optical device according to the proposed solution with the gap size between the WCLs of the two "half" TLCLs.

As illustrated in FIG. 5, the use of two WCL layers having a relatively large difference in sheet resistance can still be used to produce an accurate polarization independent TLCL. For example, a two cell structure having WCLs with respective sheet resistances $R_1$ and $R_2$ where $R_2/R_1=1.5$ can still be arranged to produce a reasonable accurate polarization insensitive lens (an optical power difference of less than 0.2 diopters) if the gap between the layers is small enough. FIG. 6 illustrates the change in optical power mismatch (in diopters "D") relative to the gap between the WCL layers for a specific example. As can be seen, a gap of less than 20 μm still produces an optical power difference between the two lens halves of less than 0.2 D, despite the large difference in WCL sheet resistance. While, no (zero) optical power difference is desired, some applications can tolerate up to about 1.2 D (or ±0.6 D) Optical Power (OP) mismatch between the two polarizations of the two half lenses.

Different coupling is employed in an alternative embodiment of the proposed solution for a polarization independent TLCL is provided which uses just a single WCL and a single hole-patterned electrode. The structure illustrated in FIG. 7 uses two TLCL cells. The lower cell of this embodiment is essentially the same as the lower cell illustrated in FIG. 4, and the reference numerals that identify the elements of the lower cell in FIG. 4 have therefore also been used for the lower cell of FIG. 7. However, unlike the embodiment of FIG. 4, the upper cell in FIG. 7 has no hole patterned electrode and no WCL. Instead, in this embodiment, both cells are driven using the same hole patterned electrode, which forms the electric fields in cooperation with the planar electrodes 32b and 32c. Thus, the upper cell has a LC layer 28c located between alignment layers 30c. A substrate 36c is located between the lower of the alignment layers 30c and the lower cell while, to the other side of the LC cell, there is a planar conductive electrode layer 32c and another substrate 34c.

Figure 7:
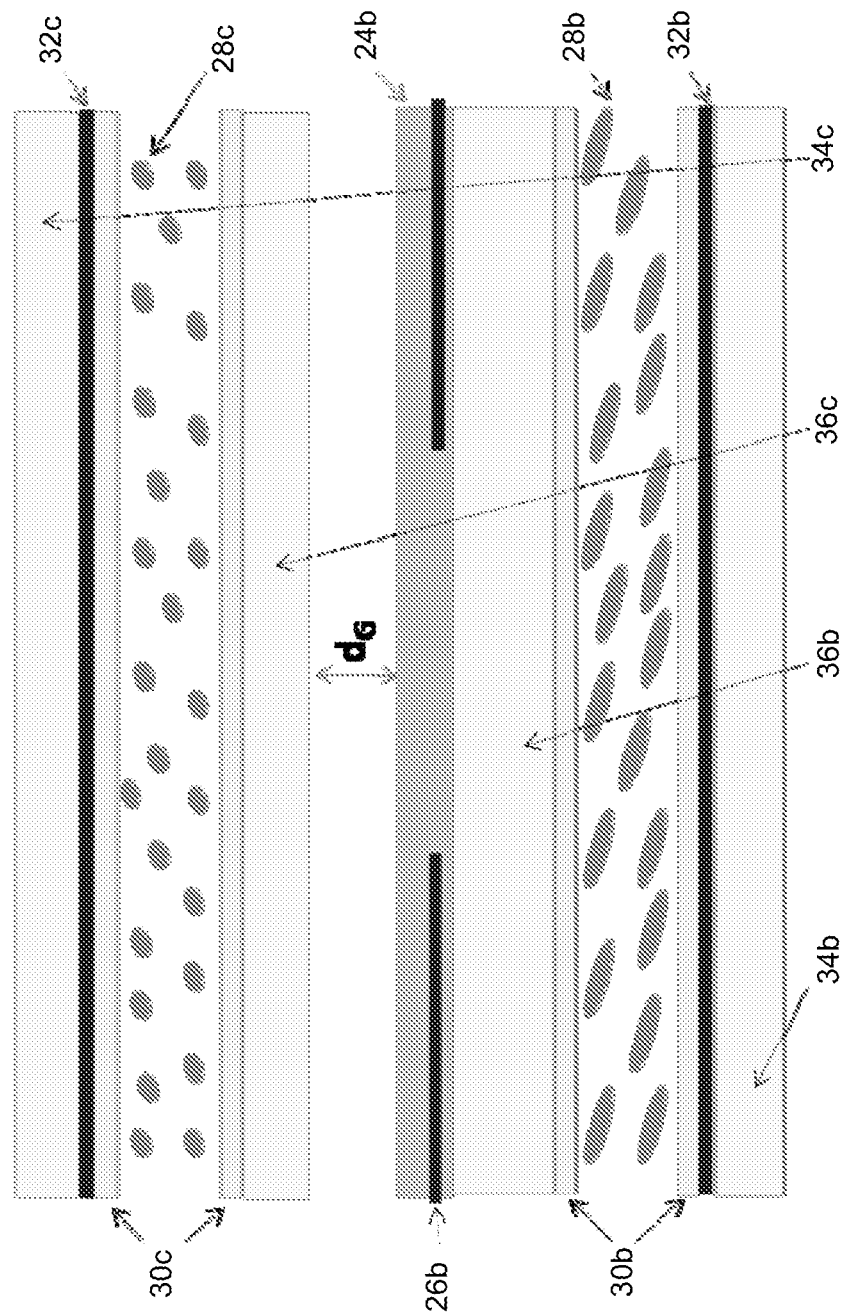
FIG. 7 is a schematic representation of a liquid crystal lens with two commonly driven LC cells in accordance with the proposed solution, where a bottom LC cell has a top ring electrode and weakly conductive layer while the top LC cell does not have a ring electrode or WCL.

The two cells of the FIG. 7 embodiment provide focusing for each of two perpendicular polarizations, as the cells of FIG. 4, however the control signals for the electrodes are not independent. Rather, an electric field for controlling the LC 28b of the lower cell is developed between the hole patterned electrode 26b and the bottom electrode 32b, in conjunction with WCL 24b. Control of the LC 28c of the upper cell, however, also makes use of the hole patterned electrode 26b and WCL 24b of the lower cell, which develop the electric field for the controlling the LC 28c along with planar electrode 32c. It will be appreciated by those skilled in the art that using a single control signal drive circuit for two cells can be advantageous over using separate control signal sources for independent cells in that the necessary number of layers and control signals is reduced. However, when independent control over the cells is desired, there is still an advantage to use coupled WCLs as described above in conjunction with FIG. 4 to achieve better control over the effective sheet resistance value.

The FIG. 7 embodiment uses a single middle electrode between upper and lower cells acting on different polarizations. This arrangement can be qualified as a particular case of previously described approach when one of the WCLs has sheet resistance that is (very high/infinite) out of range for the electrical (signal) driver. (In practice, there is always some leakage current and therefore the sheet resistance is not strictly speaking infinite, therefore the average is also finite.) Here, the thickness of the bottom substrate 36c of the upper cell is configured to be thinner than the upper substrate 36b of the bottom cell. The same WCL layer 24b is used to control two cross-oriented LC layers 28b, 28c of two TLCLs. In this case, the voltage distributions in the two cross oriented LC cells 28b, 28c and their optical powers can be synchronously driven if the unit area capacitance between the single WCL 24b and the two opposite ITO electrodes 32b, 32c (and LC layers 28b, 28c) is essentially the same (i.e., the difference between the two is smaller than a critical value). This can be achieved by appropriately choosing the gap $d_G$ between the two TLCLs, the respective thicknesses of substrates 36b and 36c, as well as the dielectric constants $\in$ of those three materials (media), i.e. the two substrates and the gap between the TLCLs. If the other parameters of the two cells are the same (the LC layers 28b, 28c have the same thickness, the LC materials have similar dielectric constants, etc.), the structure may be governed by the relationship: $d_2/\in_2 + d_G/\in_G = d_1/\in_1$, where $d_1$, $d_2$ and $d_g$ are the thicknesses, respectively, of substrate 36b, substrate 36c and the gap $d_g$, and $\in_1$, $\in_2$ and $\in_g$ are the corresponding dielectric constants (at the LC driving frequency) for each of those materials (media). This is another "coupling" condition between two TLCLs that can allow their synchronized operation with identical focus (and with the same driver circuit) for two cross-oriented polarizations.

Figure 8:
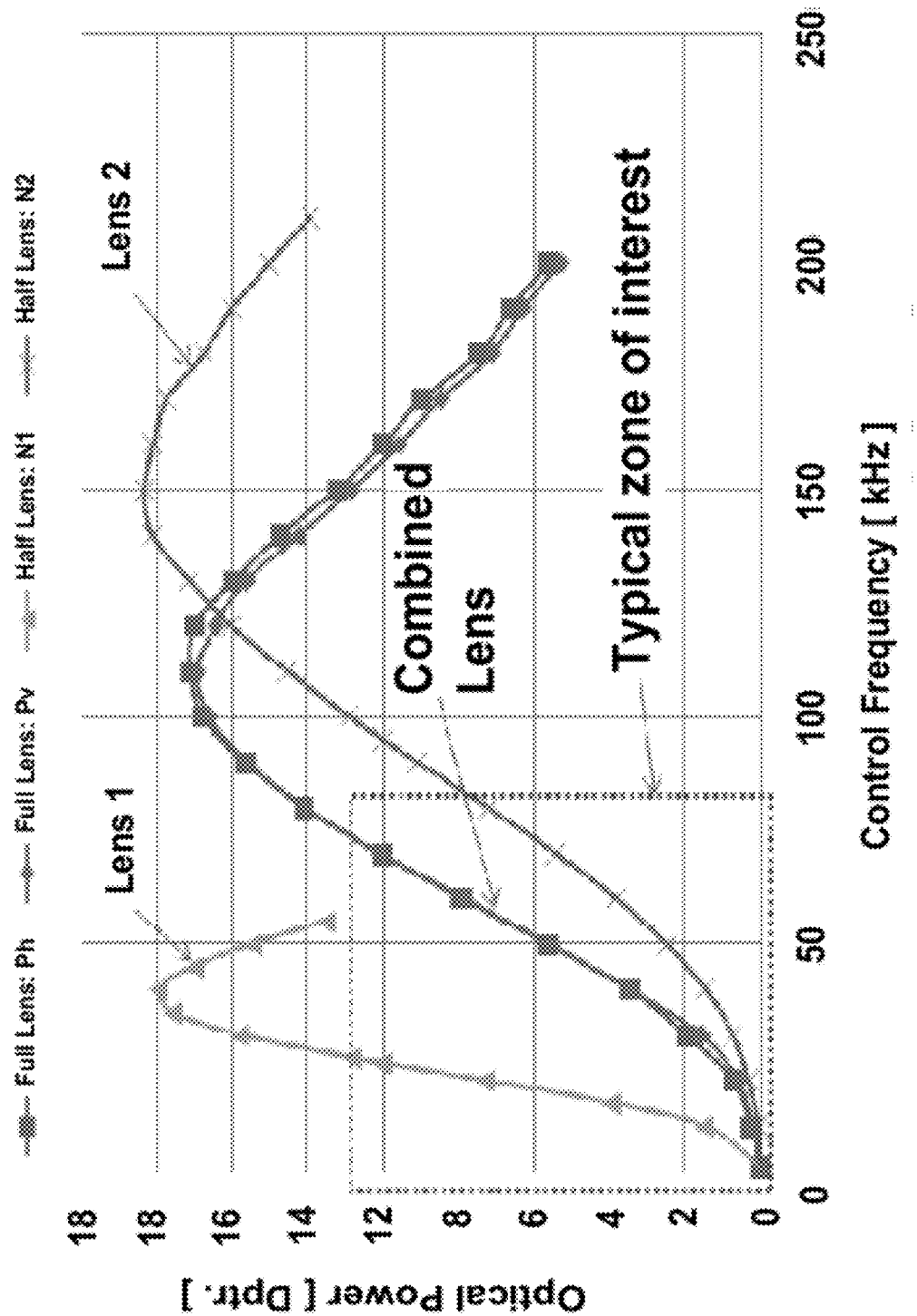
FIG. 8 is a graphical representation of the coupling effect between two different "half" lenses, in accordance with the proposed solution, as represented by a change in optical power relative to control frequency for each of the lens halves and the "combined" lens.

The performance of one of the proposed solutions illustrated in FIG. 4 is demonstrated experimentally in FIG. 8. Two independent lenses, Lens 1 and Lens 2, (each with only one liquid crystal layer and control electrode coated by a WCL), referred to as half-lenses, are first built and characterized. As can be seen, their transfer functions, i.e. the dependence of their optical power on the control frequency of the driving signal, are very different. For example, the maximum optical power for Lens 1 is achieved at a drive frequency of approximately 35 kHz, while the maximum optical power for Lens 2 is achieved at a drive frequency of approximately 150 kHz. This difference is due to the different values of sheet resistances Rs of the WCLs 36a, 36b for the two "half" lenses. However, when the two lenses are used together in accordance with the proposed solution, the two transfer functions "fuse" together due to the coupling between the two WCL layers being located closer to each other than a critical distance. The result is a combined "full" lens, and, as illustrated in FIG. 8, the transfer function of the combined lens shows that substantially the same control frequency causes both "half" lenses to operate in unison and provide the same optical power. Thus, only one signal driver can be used to focus two polarization components of the natural light in the same way.

The spacing between the upper and the lower cells of the proposed solution can be set using spacer beads or a controlled amount of adhesive. In some embodiments, the actual thickness and capacitance properties of the cells can be measured to determine what gap $d_G$ between the two TLCLs is to be set.

The invention is not limited to the LC lens layered structures illustrated herein, while distinct WCL layers are shown, when reference is made to a WCL herein after, such reference is defined to include sheet resistance dominated materials, variable conductivity, frequency dependent characteristic materials for example described in PCT application PCT/IB2009/052658 entitled "Electro-Optical Devices using Dynamic Reconfiguration of Effective Electrode Structures" filed Jun. 21, 2009, and in International Patent Application PCT/CA2011/050651 filed Oct. 14, 2011 entitled "In-Flight Auto Focus Method and System for Tunable Liquid Crystal Optical Element" claiming priority from U.S. Provisional Patent Application 61/424,946 filed Dec. 20, 2010, both of which are incorporated herein by reference, and doped liquid crystal layers for example described in PCT application PCT/IB2009/052658 entitled "Electro-Optical Devices using Dynamic Reconfiguration of Effective Electrode Structures" filed Jun. 21, 2009, which is incorporated herein by reference.

Figure 9:
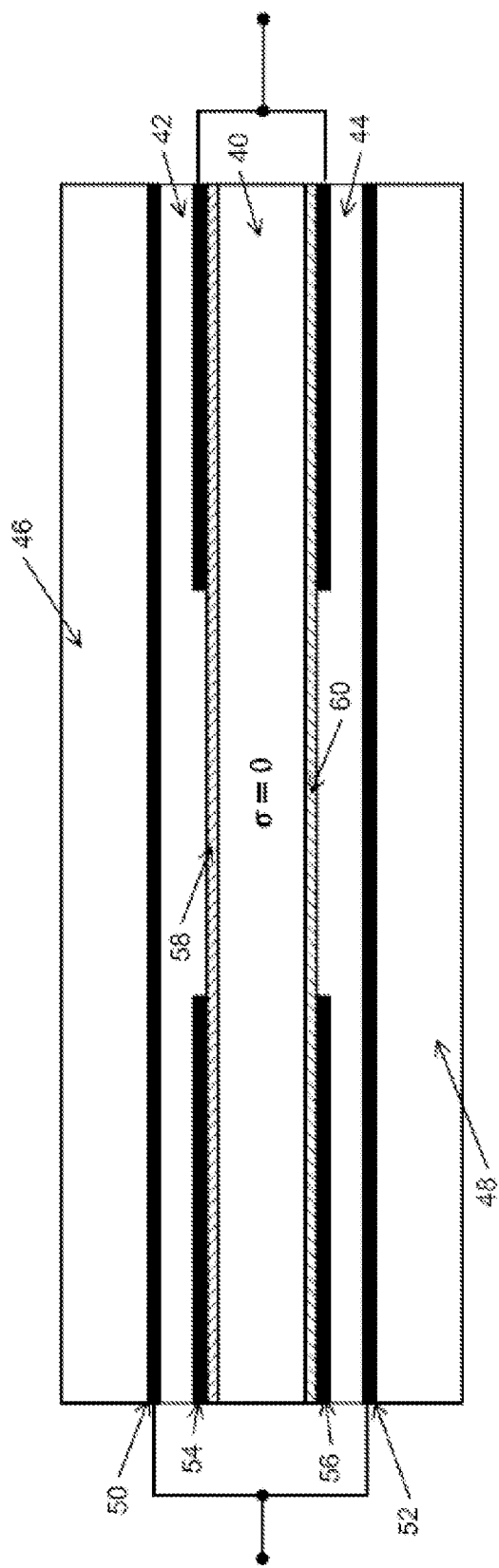
FIG. 9 is a schematic representation of a liquid crystal lens, in accordance with the proposed solution, with two LC cells and two weakly conductive layers that are commonly driven, where the two cells share a common substrate with high dielectric constant.

Illustrated in FIG. 9 is another embodiment of the proposed solution in which a middle substrate 40 is located between two LC layers 42, 44. To the other side of LC layer 42 is a top substrate 46 and to the other side of LC layer 44 is a bottom substrate 48. Each of substrates 46, 48 has a planar transparent electrode 50 and 52, respectively, coated on the side of the substrate facing the middle substrate 40. The middle electrode structure has two hole patterned electrodes 54, 56, one on either side of the substrate 40, and located between the middle substrate and each of the hole patterned electrodes 54, 56 is a WCL 58 and 60, respectively.

In the FIG. 9 embodiment, the two planar electrodes 50, 52 have a common electrical connection, and the two hole patterned electrodes 54, 56 have a common electrical connection. An electrical signal applied between the planar electrodes and the hole patterned electrodes produces electric fields across each of the LC layers 42, 44, respectively. The placement of the hole patterned electrodes 54, 56 and the WCLs 58, 60 inside the LC cells allows the use of a significantly lower voltage (signal amplitude) for the driving signal. As in the embodiments described above, the two WCLs 58, 60 will have a combined (synchronized) effect on the electric fields controlling the LC layers 42, 44 due to coupling even as the fabrication of a layered structure such as this may lead to larger differences in the sheet resistance Rs of the two WCLs 58, 60. These differences, however, can be mitigated by decreasing the d/∈ ratio for the middle substrate 40.

Figure 12:
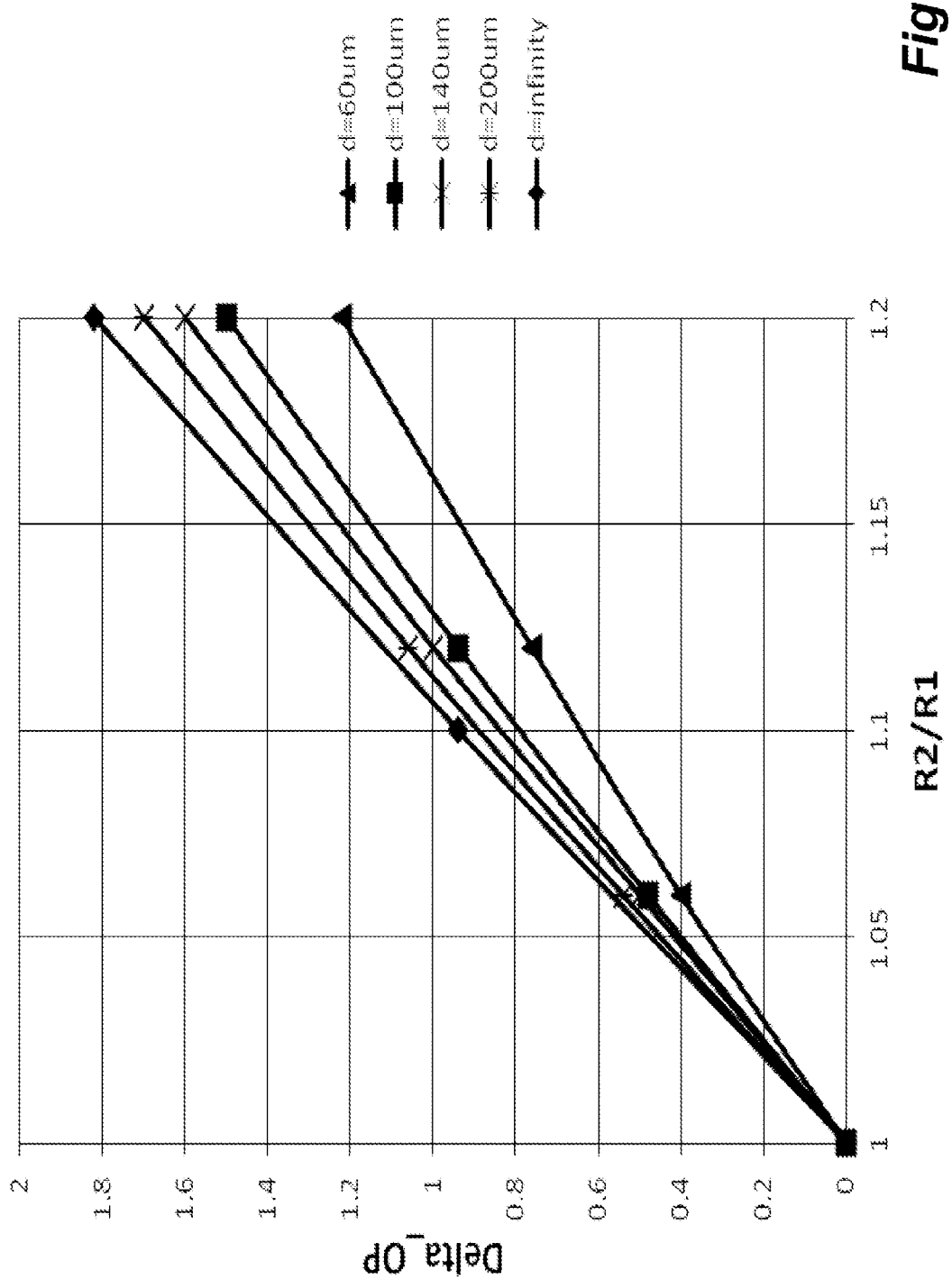
FIG. 12 graphically illustrates variations in optical power mismatch between Rs mismatched WCL layers for polarization independent tunable liquid crystal lens optical devices having a ring hole patterned electrode diameter of 2 mm.
Figure 13:
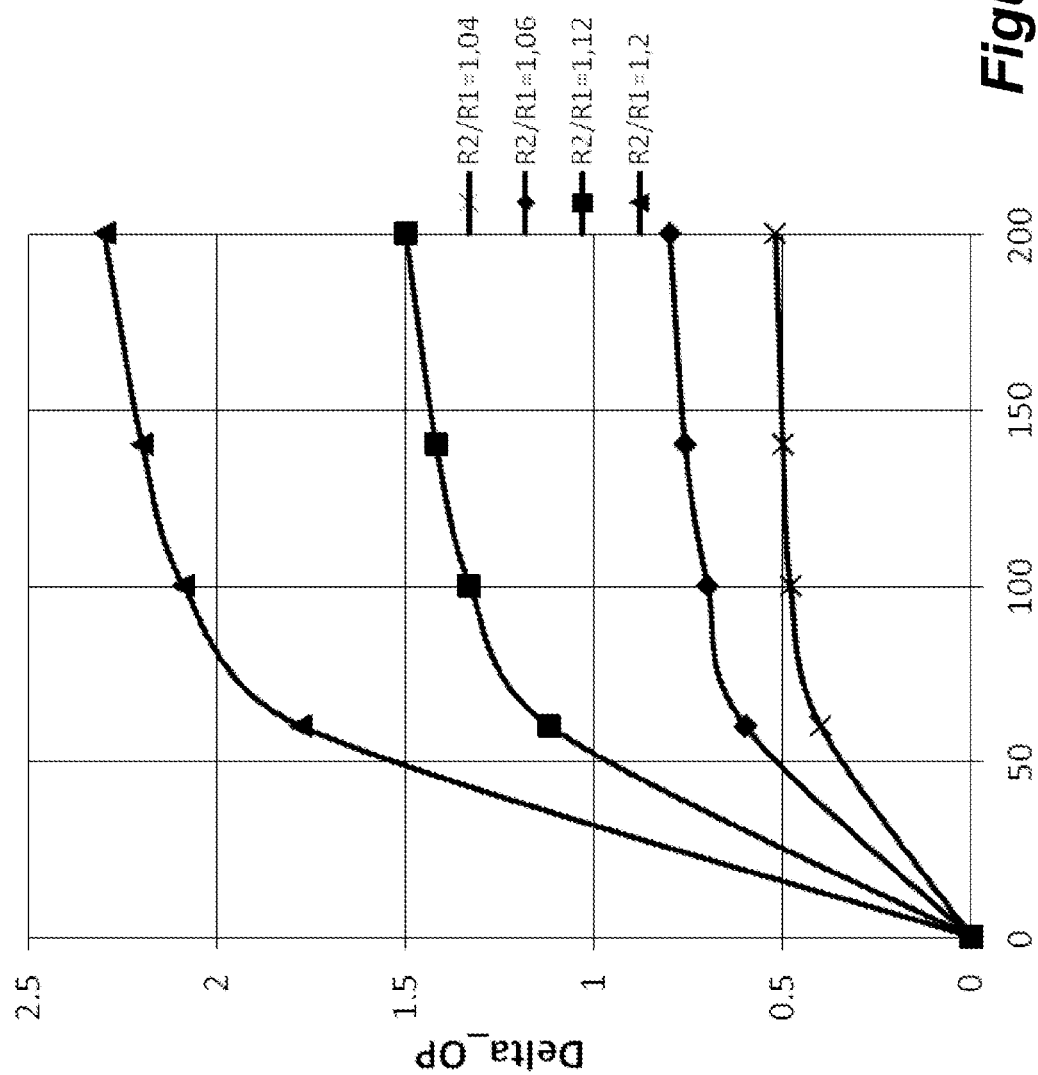
FIG. 13 graphically illustrates measured variations in optical power mismatch with gap spacing d between Rs mismatched WCL layers for polarization independent tunable liquid crystal lens optical devices having a ring hole patterned electrode diameter of 1.8 mm.

With reference to polarization independent full-lens implementations such as illustrated in FIG. 9, experimental trials point to the optical power mismatch between half lenses generated by the Rs mismatch, being dependent not only on the dielectric constant and thickness of the mid substrate 40, but also on lens geometry (design). FIG. 12 graphically illustrates variations in optical power mismatch between WCL layers 58 and 60 having varying amounts of Rs mismatch for polarization independent tunable liquid crystal lens optical devices having a hole patterned electrode 54 and 56 aperture ring diameter (ARD) of 2 mm. FIG. 13 graphically illustrates measured variations in optical power mismatch between WCL layers 58 and 60 with gap spacing d for polarization independent tunable liquid crystal lens optical devices having a hole patterned electrode 54 and 56 aperture ring diameter (ARD) 1.8 mm.

Figure 11:
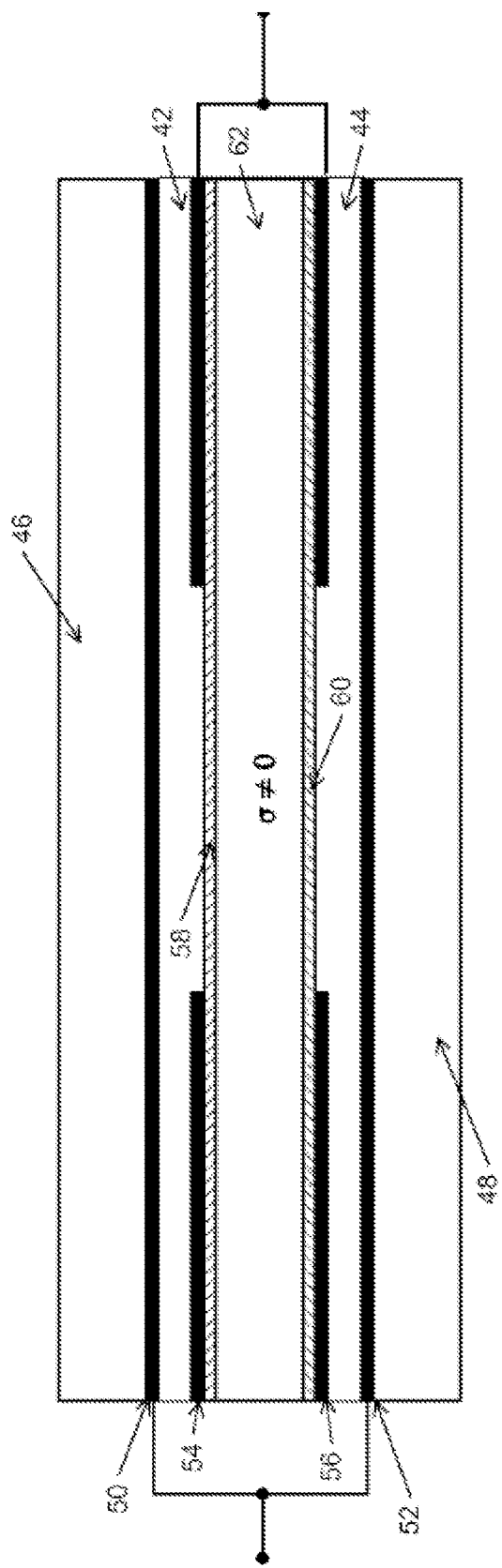
FIG. 11 is a schematic representation of a liquid crystal lens like that of FIG. 9 but for which the common substrate is of a weakly conductive material, and also has separate, discrete weakly conductive layers located thereupon.

Another variation of this embodiment is illustrated in FIG. 11. In this version, the WCLs 58, 60 are again present, however the middle substrate 62 also has a non-zero conductivity which contributes to the coupling between the WCLs 58, 60. A lower driving voltage can be used with this embodiment, and the electric field is influenced by not only the WCLs 58, 60 but also by the weakly conductive characteristic of the middle substrate 62. In this embodiment, it is desirable that the sheet resistances of the WCLs 58, 60 are much lower than $1/d\sigma$, where d is the gap between the two WCLs 58, 60 and $\sigma$ is the conductivity of the middle substrate 62.

Figure 10:
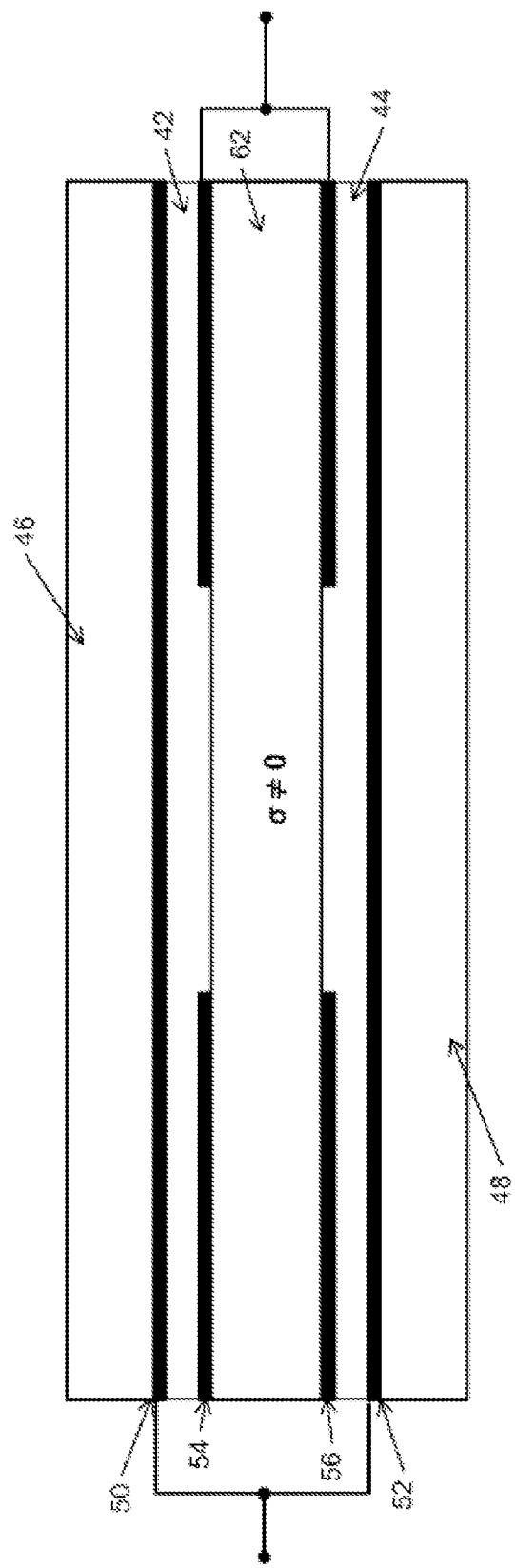
FIG. 10 is a schematic representation of a liquid crystal lens like that of FIG. 9, but for which the common substrate comprises a weakly conductive material and itself functions as the weakly conductive layers, in accordance with the proposed solution.

FIG. 10 illustrates a further variation of the embodiment of FIG. 9 in which WCLs 58, 60 are directly adjacent, in contact, fused, etc. (substantially separate WCLs 58, 60 are not present). Rather, the material chosen for the middle substrate 62 is selected to have a desired weakly conductive characteristic and to, therefore, function in place of separate WCL layers substantially as coupled WCLs. As in the FIG. 9 embodiment, the layered structure of FIG. 10 allows a lower driving voltage to be used, and both electric fields are influenced by the weakly conductive characteristic of the middle substrate 62. However, where the middle substrate 40 of the FIG. 9 embodiment is not conductive, the middle substrate 62 of FIG. 10 has a non-zero conductivity contributing to coupling. For example, such materials include:

| Optical Materials | Electrical properties |
|---|---|
| glass: D263T (bulk) | $\epsilon = 6.7$ |
| glass: AF32 (bulk) | $\epsilon = 5.1$ |
| new high $\epsilon$ glass (Schott) (bulk) | $\epsilon = 13$ |
| doped glass (bulk) | $\epsilon > 15$ |
| Silicium carbide (SiC) (thin film) | $\epsilon = 10.2$ |
| chalcogenide glass (bulk or thin film) | Conductive or variable $\epsilon > 10$ |
| conductive glass (bulk) Journal of Non-Crystalline Solids 112 (1989) 318-322 | conductive |
| epoxide based composite (bulk or thin film) | variable $\epsilon > 10$ |
| blended Polymer (bulk or thin film) | variable $\epsilon > 10$ |
| polymer glass (bulk) | variable $\epsilon > 10$ |
| polymer film capacitors (bulk) | variable $\epsilon > 10$ |
| polymer doped carbon nanotube and graphene (bulk) | conductive |
| conductive polymer (bulk) | conductive |
| doped oxide-based thin film (bulk or thin film) | conductive |

From a manufacturing perspective, FIGS. 9, 10 and 11 illustrating LC full-lens (polarization independent) geometries, the mid substrates 40, 62 can be implemented as two separate substrates, for example bonded by a thin layer of adhesive. The invention is not limited to same thickness separate mid substrates (40/62). As well, the order of the weakly conductive layers and hole patterned electrodes can be reversed as illustrated in FIG. 4.

Conductive Floating Electrode Wavefront Adjustment

Figure 14:
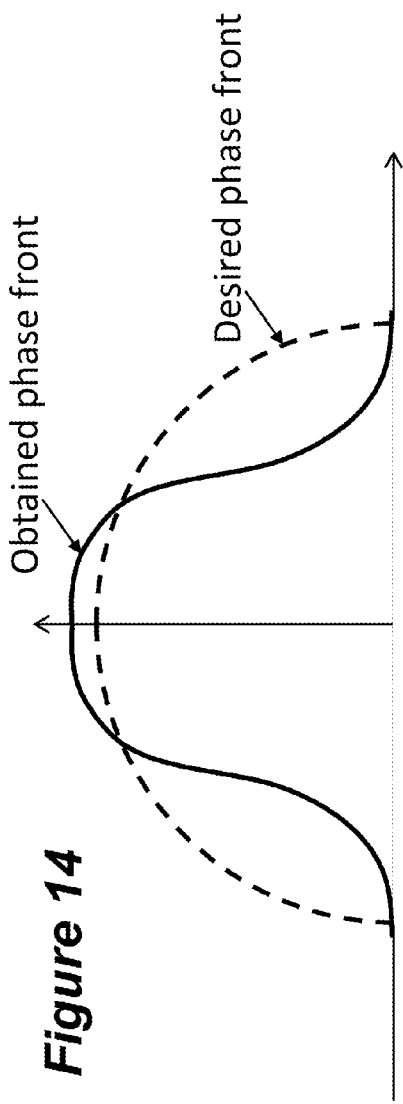
FIG. 14 is a schematic diagram illustrating in exaggerated fashion aspherical wavefront distortions as generated by a hole patterned ring electrode and a weakly conductive layer, and an example (among others) of a desired form is also shown.

It has been realized that the drastic radial drop in electric field strength across the LC layer generated by a hole patterned electrode and weakly conductive layer electric field control structure combination causes departures from a spherical wavefront of a Liquid Crystal (LC) lens optical device. FIG. 14 illustrates, in exaggerated fashion, a LC lens subjecting incident light to an aspherical wavefront which tends to have a flattened central top and a Gaussian-like drop-off towards the periphery. Depending on material properties of the LC lens and geometry parameters such as: the ratio between the hole patterned ring electrode diameter, electrode spacing, etc. the Modulation Transfer Function (MTF) of the LC lens in some cases provides either a central in-focus region within the clear aperture or a peripheral in-focus region within the clear aperture, this may be unacceptable for (large) millimeter size clear aperture applications since it degrades significantly the modulation transfer function of the camera in which the LC lens is employed.

It has been discovered that a floating electrode can be used to reshape the wavefront otherwise generated by a hole patterned electrode and weakly conductive layer combination. In accordance with the proposed solution, depending on layered structure geometry and material properties, at least one of: a disc, ring and donut shaped floating electrode can be employed to reshape the wavefront generated by a hole patterned electrode and weakly conductive layer combination towards a spherical wavefront.

Figure 15:
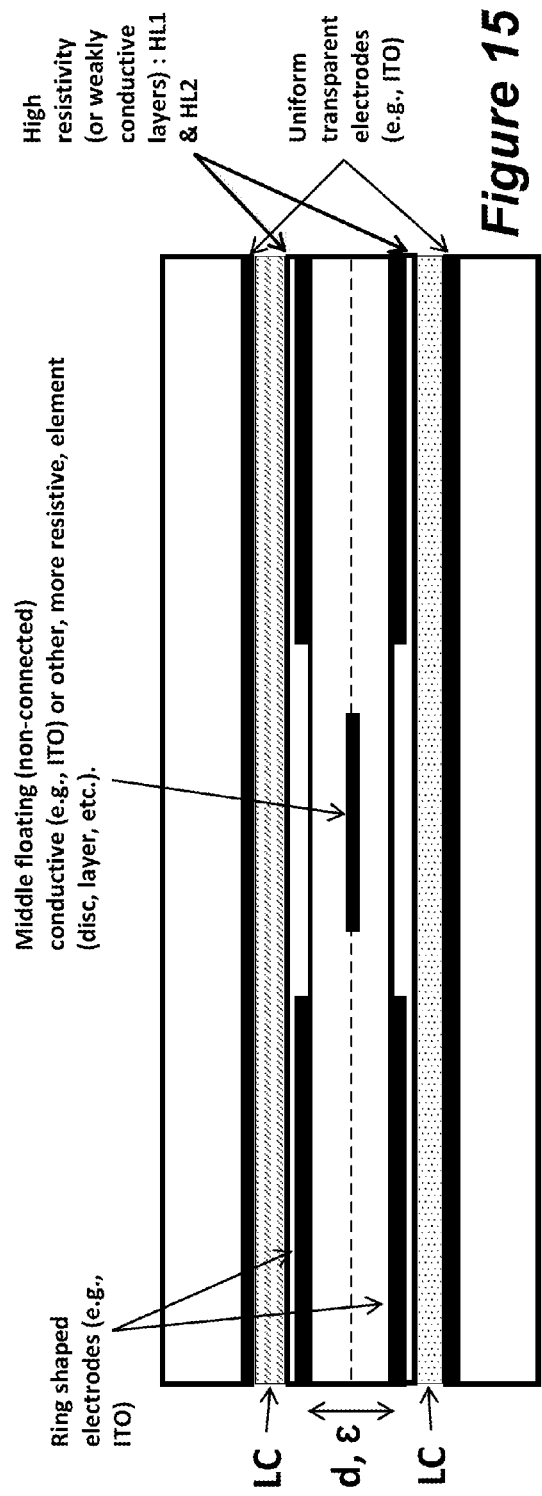
FIG. 15 is a schematic diagram illustrating a liquid crystal lens, in accordance with the proposed solution, with two LC cells and two commonly driven weakly conductive layers and a common floating electrode in a shared common substrate.

In accordance with an implementation of the proposed solution, FIG. 15 illustrates an electrically floating, i.e. not electrically connected, disc-shaped layer between two WCL layers. Preferably the floating layer is non-dielectric in nature, including conductor or semiconductor materials, and as such can be an un-driven electrode which transforms the phase profile towards a desired (for example, spherical) phase profile. Disc shaped floating electrodes tend to affect (circularize in cross-section) the central part of the electric field, while ring/donut shaped floating electrodes tend to affect (circularize in cross-section) the peripheral part thereof. Generally, as the floating electrodes are located along the optical path within the hole patterned ring electrode diameter and possibly within the clear aperture of the optical device, the floating electrodes are typically transparent. Typically for LC lens optical devices, floating electrodes employed are preferably transparent, although in some implementations the floating electrode can also participate in defining the optical aperture of the (overall) optical device, in which case the floating electrode may not be wholly transparent. For diffractive optical devices, the floating electrode can also be configured to provide a degree of diffraction or diffraction correction and the floating electrode need not be wholly transparent.

From a manufacturing perspective, FIG. 15 illustrates a LC full-lens (polarization independent) geometry similar to the full-lens geometries illustrated in FIGS. 9 and 11 wherein the mid substrate 40/62 is implemented as two separate substrates on at least one of which the floating electrode is deposited. The invention is not limited to same thickness separate mid substrates (40/62). The invention is also not limited to depositing the floating electrode between the separate mid substrates (40/62) of an LC lens optical device. The floating electrode can be deposited on the side of a single mid substrate 40/62 either in contact or not in contact with the WCL layer on that corresponding side of the mid substrate 40/62 to provide the operational wavefront adjustment effect sought in the overall optical device.

In accordance with another embodiment of the proposed solution, at least one floating electrode is employed in an optical device layered geometry in which WCL layer spacing is preferably, but not necessarily, less than critical dielectric distance providing coupled operation influencing the performance thereof. In a LC full-lens, the floating electrode is positioned between the two liquid crystal half-lenses providing synchronized operation of the combined full-lens by generating phase front profile adjustments in each half-lens. For example, phase front adjustments towards a spherical wavefront can be provided for LC lens geometries (and parameters) such as illustrated in, but not limited to: FIGS. 9 to 11.

Figure 16:
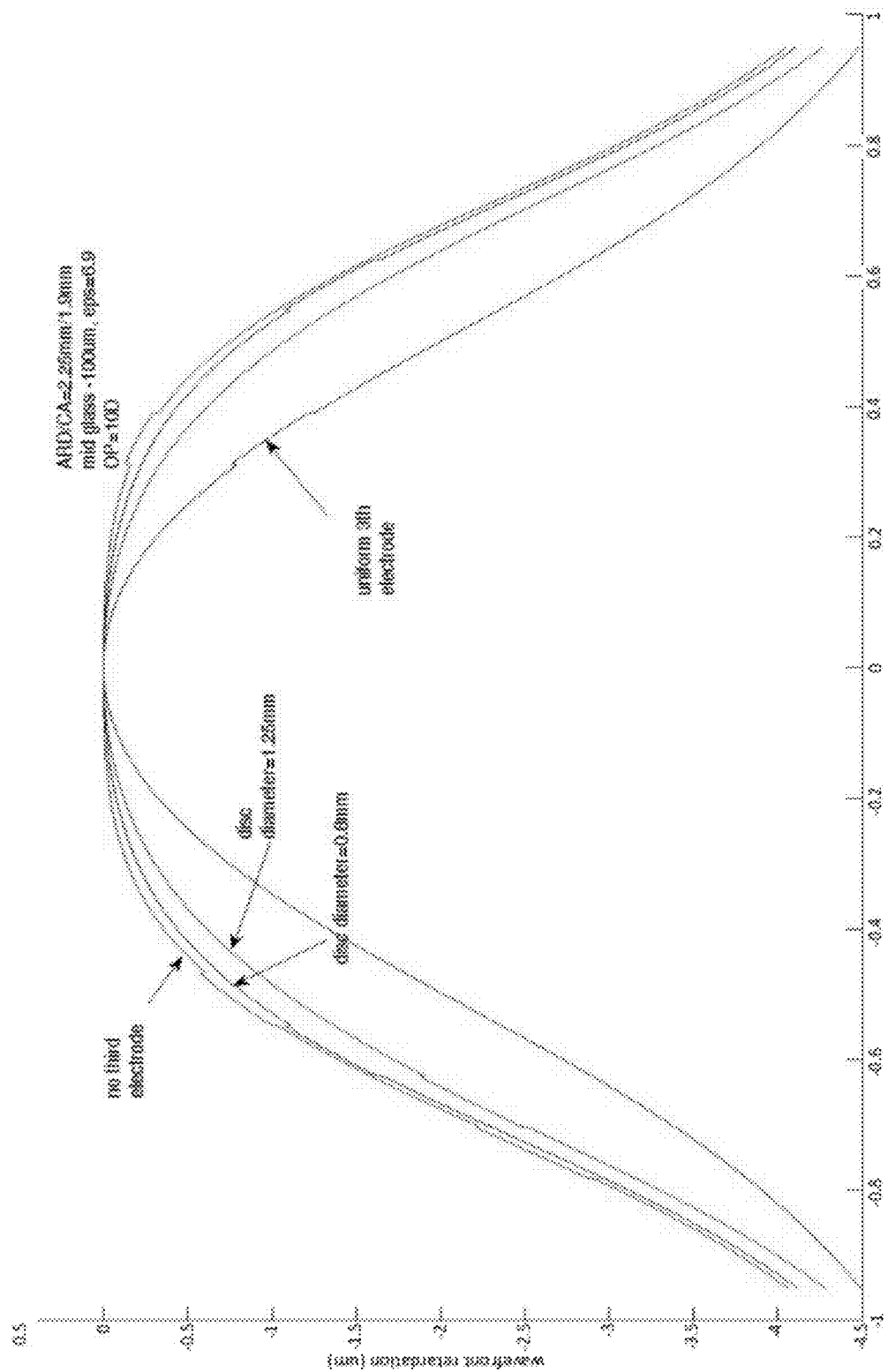
FIG. 16 is a graph illustrating wavefront adjustment in a LC lens having a layered geometry as illustrated in FIG. 15 by employing a conductive disc floating electrode in accordance with the proposed solution.

FIG. 16 graphically illustrates wavefront adjustment in a LC lens employing a conductive disc floating electrode in a layered geometry illustrated in FIG. 15 with WCL coupling at gap spacing d=100 μm and ∈=6.9. The curve labeled "no third electrode" corresponds to layer geometries such as illustrated in FIGS. 9 and 11, without a floating electrode present, providing a wavefront profile having a flat region in the center leading to relatively high spherical aberrations. For the illustrative LC lens geometry having a hole patterned electrode Aperture Ring Diameter (ARD) of 2 mm, the addition of a floating electrode, in the example a disc of ITO, the wavefront profile becomes more and more spherical in the center with an increase in the diameter of the floating electrode. However, the wavefront profile improvement is lost if the diameter of the floating electrode disc is larger than the diameter of the hole patterned ring-shaped electrode as illustrated by the curve labeled "uniform 3rd electrode".

Figures 17A, 17B:
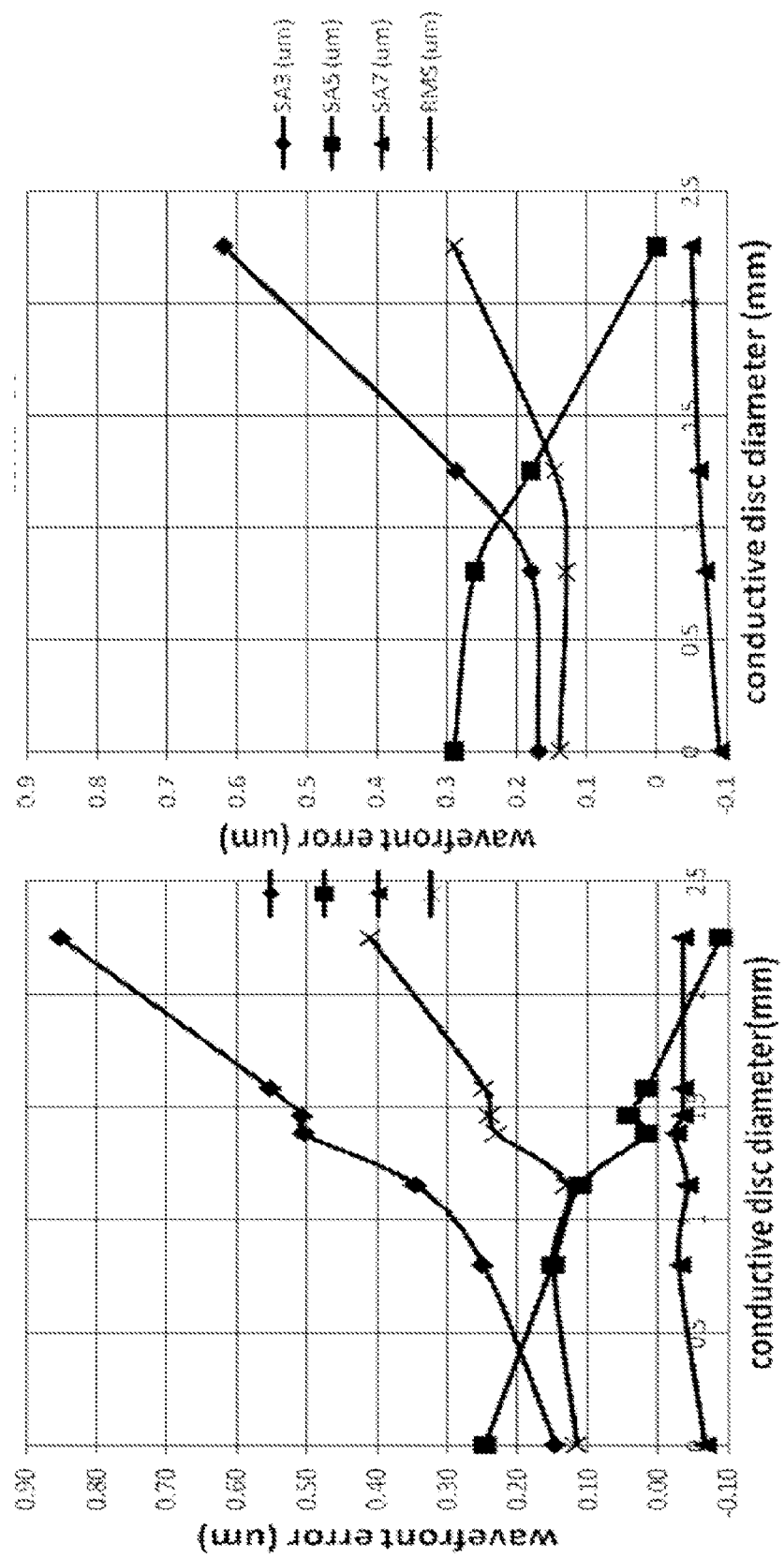
FIG. 17A is a graph illustrating, in accordance with the proposed solution, experimental wavefront adjustment results achieved for the LC lens geometry illustrated in FIG. 15.
FIG. 17B is a graph illustrating, in accordance with the proposed solution, simulation results of wavefront adjustment for the LC lens geometry illustrated in FIG. 15.

FIG. 17B illustrates simulation results of wavefront adjustment at 10 diopter optical power for the LC lens geometry illustrated in FIG. 15. Experimental results graphically illustrated in FIG. 17A for the same LC lens geometry, provide confirmation of the qualitative behavior. The curves illustrate Spherical Aberrations (SA) of particular orders 3, 5 and 7, and the "RMS" curve illustrates RMS aberrations. The results are driving voltage dependent.

Figure 18:
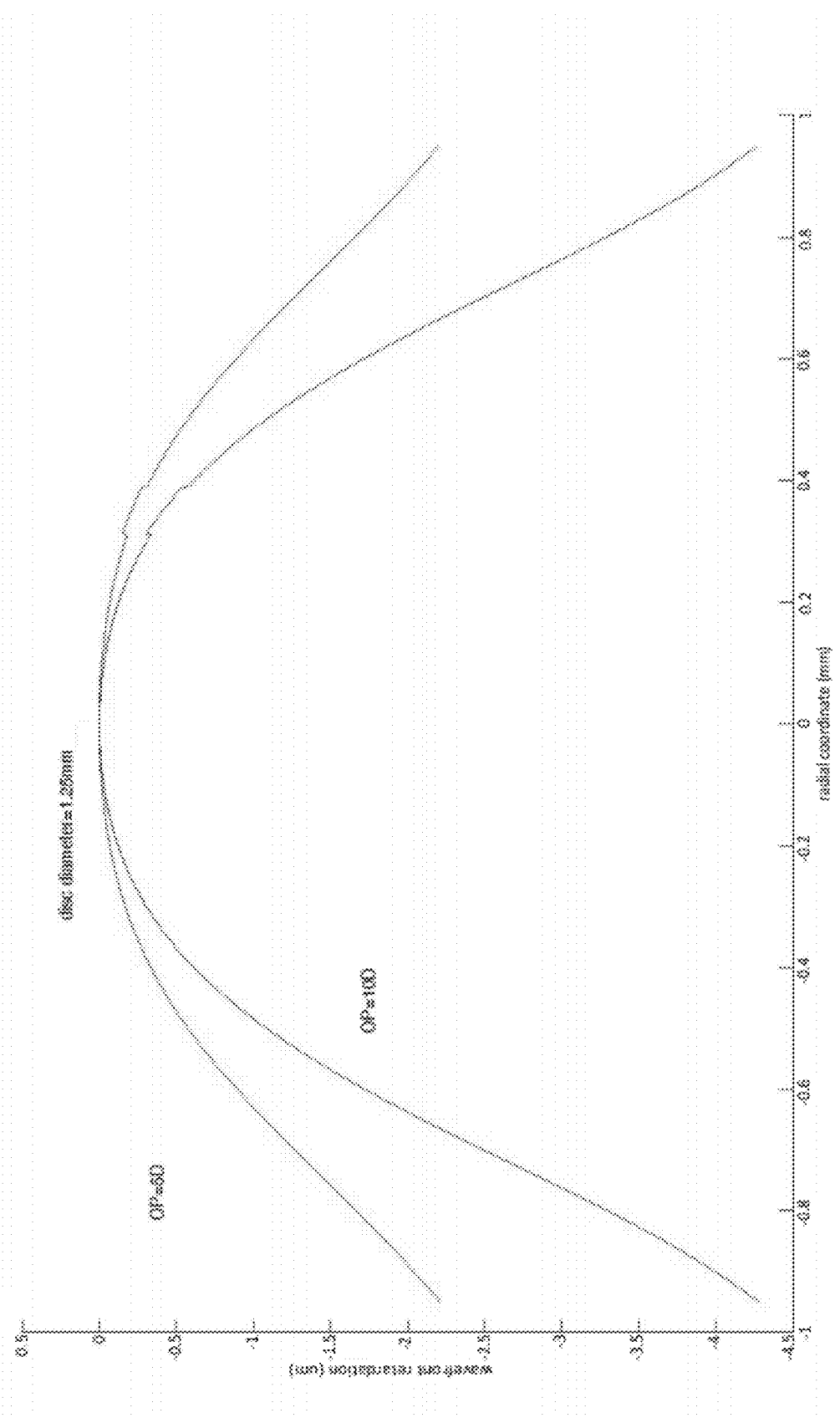
FIG. 18 is a graph illustrating, in accordance with the proposed solution, circularization of the wavefront profile improvement being retained at other optical power settings employing the same disc shaped floating electrode.

The geometry of the floating electrode can be configured for different optical device parameters (including parameters relating to camera formats in which an LC lens is used) such as, but not limited to: mid substrate/gap thickness, clear aperture, gap material dielectric constant, etc. The general tendencies are similar, with some quantitative differences, which can be taken into account for each LC lens. FIG. 18 illustrates circularization (in cross-section) of the wavefront profile improvement of the disc shaped floating electrode being retained at other optical power settings for example at 5 diopters and 10 diopters.

For certainty, if a flattened wavefront profile portion is required for a particular application, a conductive floating electrode in contact with the WCL can be employed for such purpose. Also, conductive glass can be employed to obtain a conductive floating electrode.

Floating Electric Field Control Structure Wavefront Adjustment

The invention is not limited to conductor/semiconductor floating electrode materials. In accordance with another embodiment of the proposed solution, the use of a floating "resistive" element such as, but not limited to a: disc, ring, donut, etc. can be used in an electric field control structure to provide additional dynamic control of the phase front. If the material has a frequency dependent conductivity, frequency dependent control of the optical device is provided.

Figure 19:
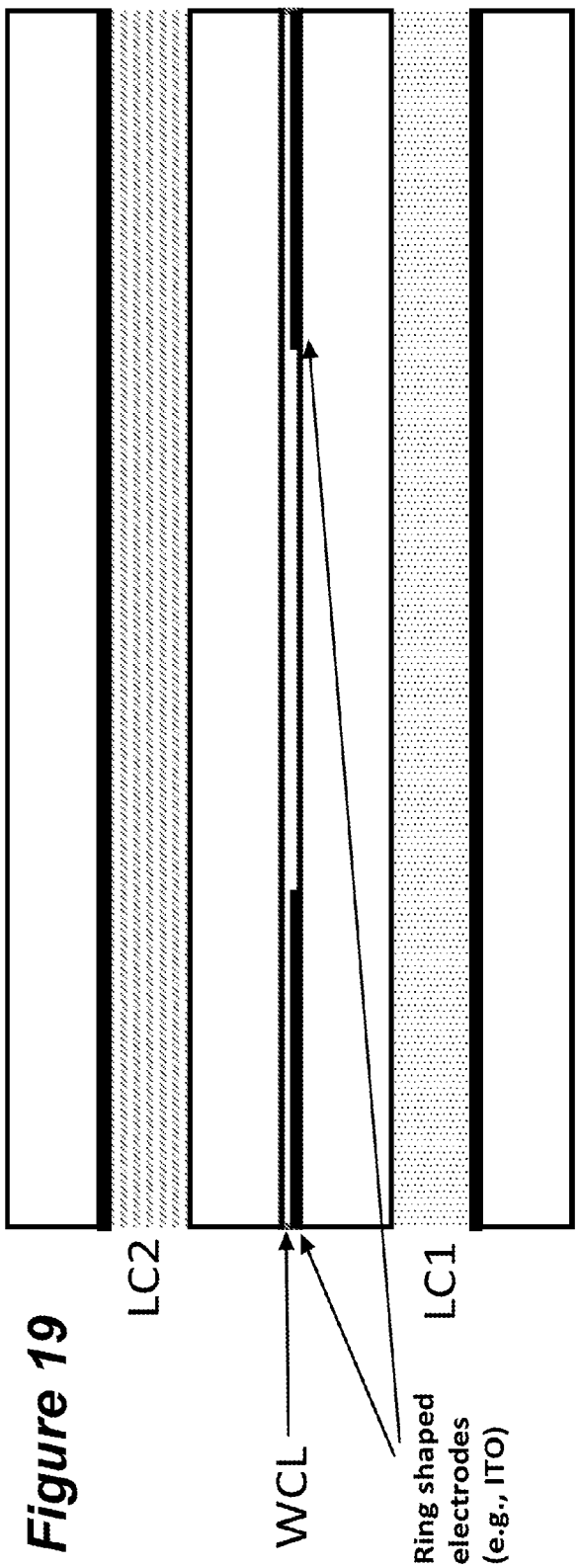
FIG. 19 is a schematic diagram illustrating a polarization independent full-lens layered structure employing a single central hole patterned ring electrode and a single weakly conductive layer to synchronously operate two LC half-lenses, in accordance with the proposed solution.

FIG. 19 illustrates a polarization independent full-lens layered structure employing a single central hole patterned ring electrode and a single weakly conductive layer to synchronously operate both LC half-lenses as described in PCT application PCT/IB2009/052658 entitled "Electro-Optical Devices using Dynamic Reconfiguration of Effective Electrode Structures" filed Jun. 21, 2009, and in International Patent Application PCT/CA2011/050651 filed Oct. 14, 2011 entitled "In-Flight Auto Focus Method and System for Tunable Liquid Crystal Optical Element" claiming priority from U.S. Provisional Patent Application 61/424,946 filed Dec. 20, 2010, both of which are incorporated herein by reference. A single WCL layer preferably, but not necessarily, including a frequency dependent material is employed with a single hole patterned ring electrode common to both LC half-lenses to synchronously control electric fields on either side of the central hole patterned electrode between the central hole patterned electrode and flat electrodes on the outer sides of each LC half-lens.

Figure 21:
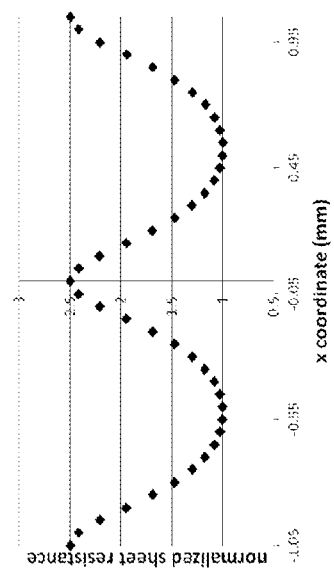
FIG. 21 is a graph illustrating, in accordance with the proposed solution, a sheet resistance spatial distribution configured to provide a phase front adjustment corresponding to the quadratic fit illustrated in FIG. 20.
Figures 20, 22:
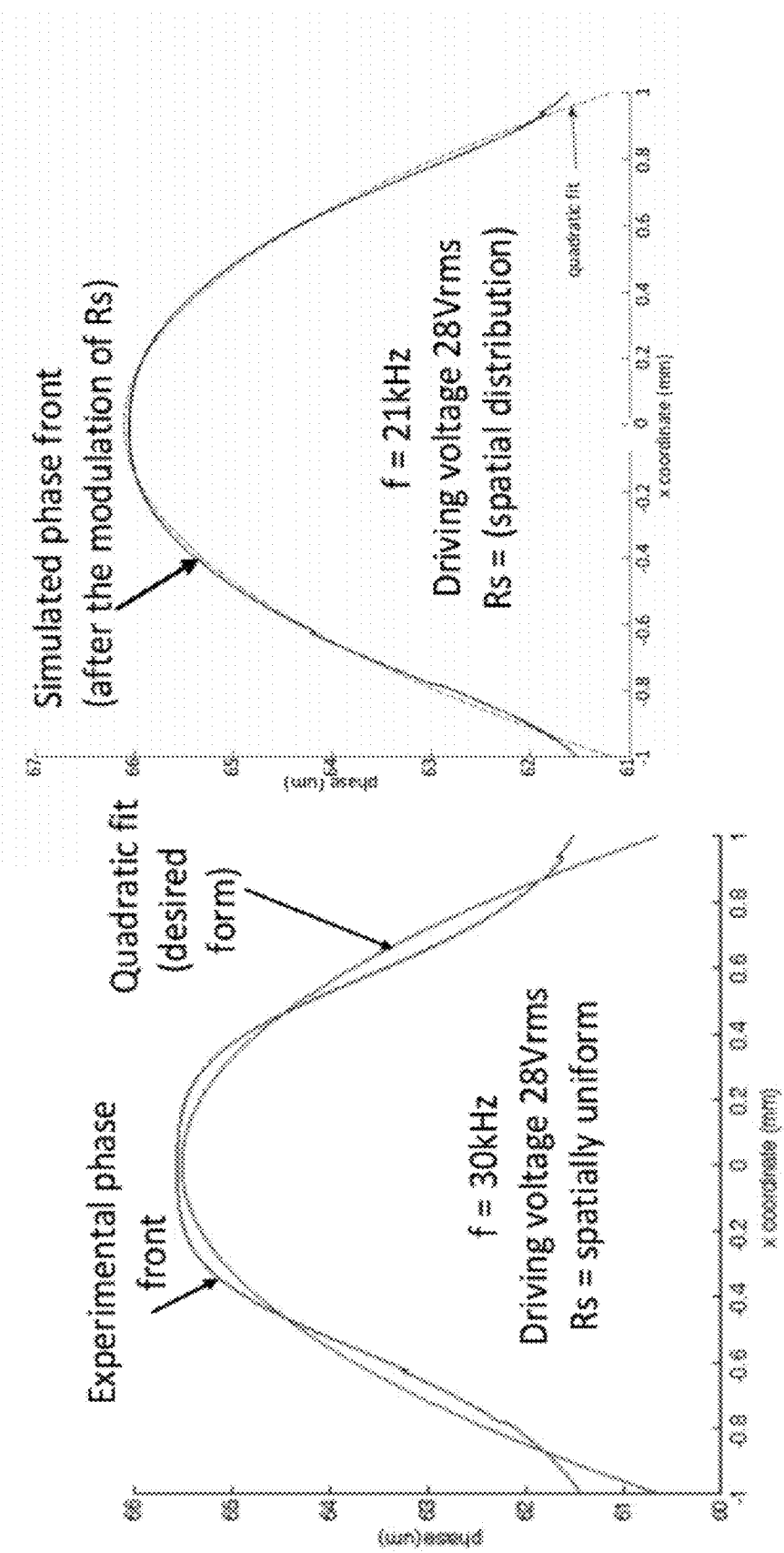
FIG. 20 is a graph illustrating, in accordance with the proposed solution, a quadratic fit for circularizing an experimentally obtained wavefront profile for a liquid crystal lens geometry as illustrated in FIG. 19.
FIG. 22 is a graph illustrating, in accordance with the proposed solution, confirmation that wavefront circularization is retained when a drive signal having a 21 kHz frequency and the same voltage amplitude is used with the same LC lens geometry illustrated in FIG. 19.

In accordance with another embodiment of the proposed solution, a WCL having a spatial distribution can be employed to circularize the wavefront profile. FIG. 20 illustrates a measured wavefront profile and a corresponding best quadratic fit for a LC full-lens geometry as illustrated in FIG. 19 having a driving signal voltage amplitude of 28 Vrms and frequency of 30 kHz with a spatially uniform WCL sheet resistance Rs. FIG. 21 is a graph of the normalized sheet resistance configured to provide the phase front adjustment corresponding to the quadratic fit illustrated in FIG. 20 where X as the radial direction. FIG. 22 confirms that wavefront circularization is retained for the same LC lens geometry when a drive signal having a 21 kHz frequency and the same voltage amplitude is used.

Figure 23:
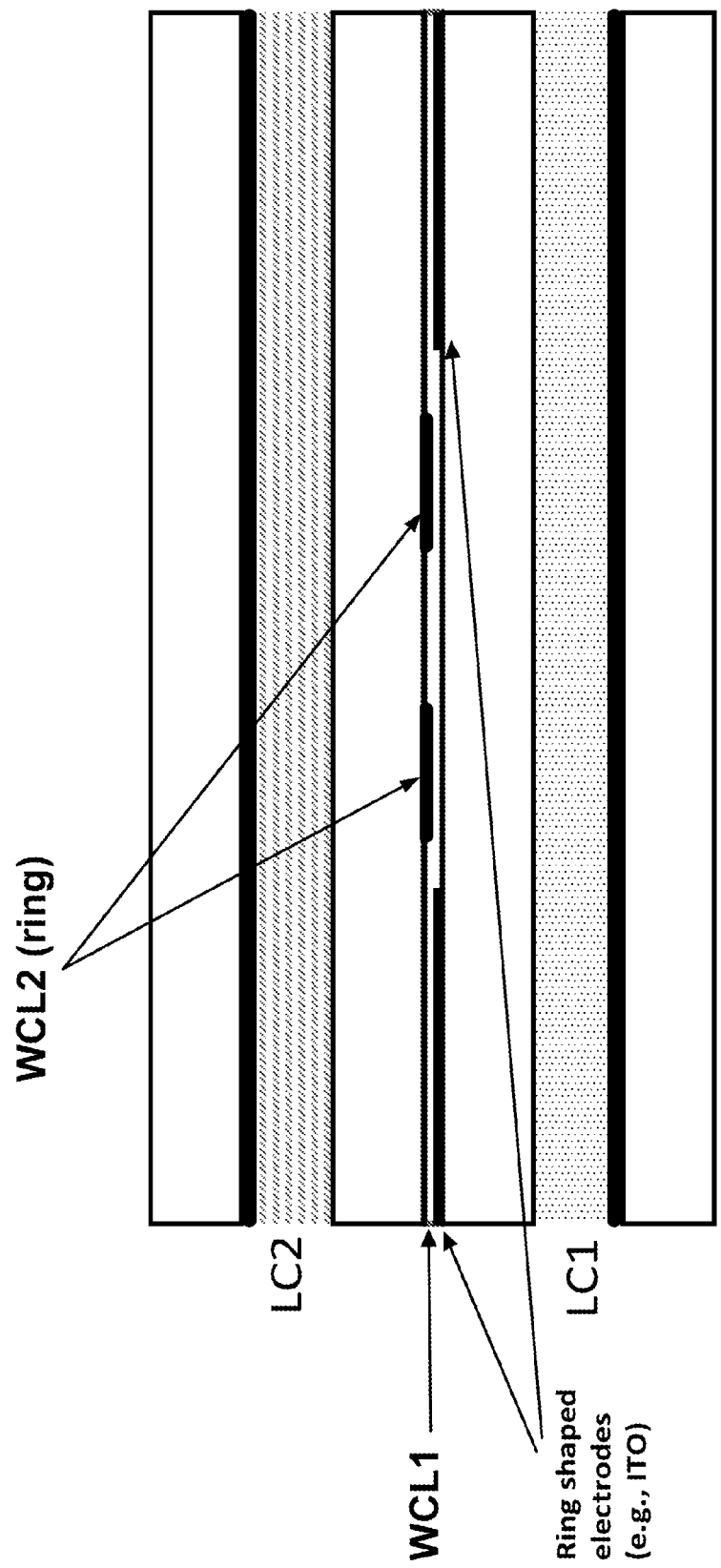
FIG. 23 is a schematic diagram illustrating a polarization independent full-lens layered structure employing a weakly conductive ring, in accordance with another implementation of the proposed solution.
Figure 24:
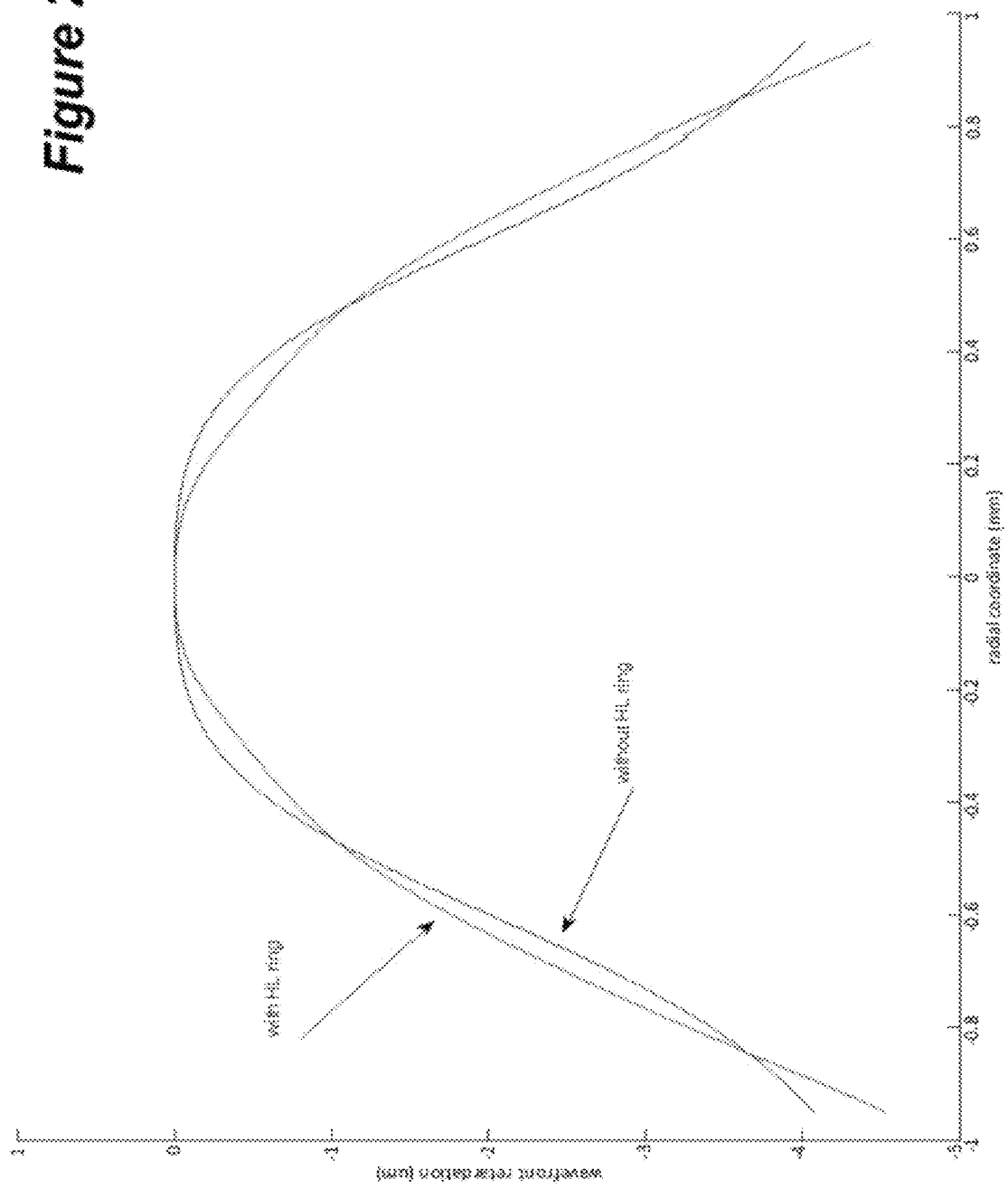
FIG. 24 is a graph illustrating, in accordance with the proposed solution, wavefront circularization provided by a weakly conductive ring illustrated in FIG. 23.

In accordance with another implementation of the latter embodiment of the proposed solution, a ring/donut shaped Rs spatial distribution is employed to circularize the wavefront profile. FIG. 23 illustrates an LC full-lens layered structure with a single WCL central ring element. A second WCL ring/donut layer can be employed to provide a first order circularization correction as illustrated in FIG. 24. While the flat top is diminished, the improved wavefront drop-off includes successively steeper sloped profile.

Figure 25:
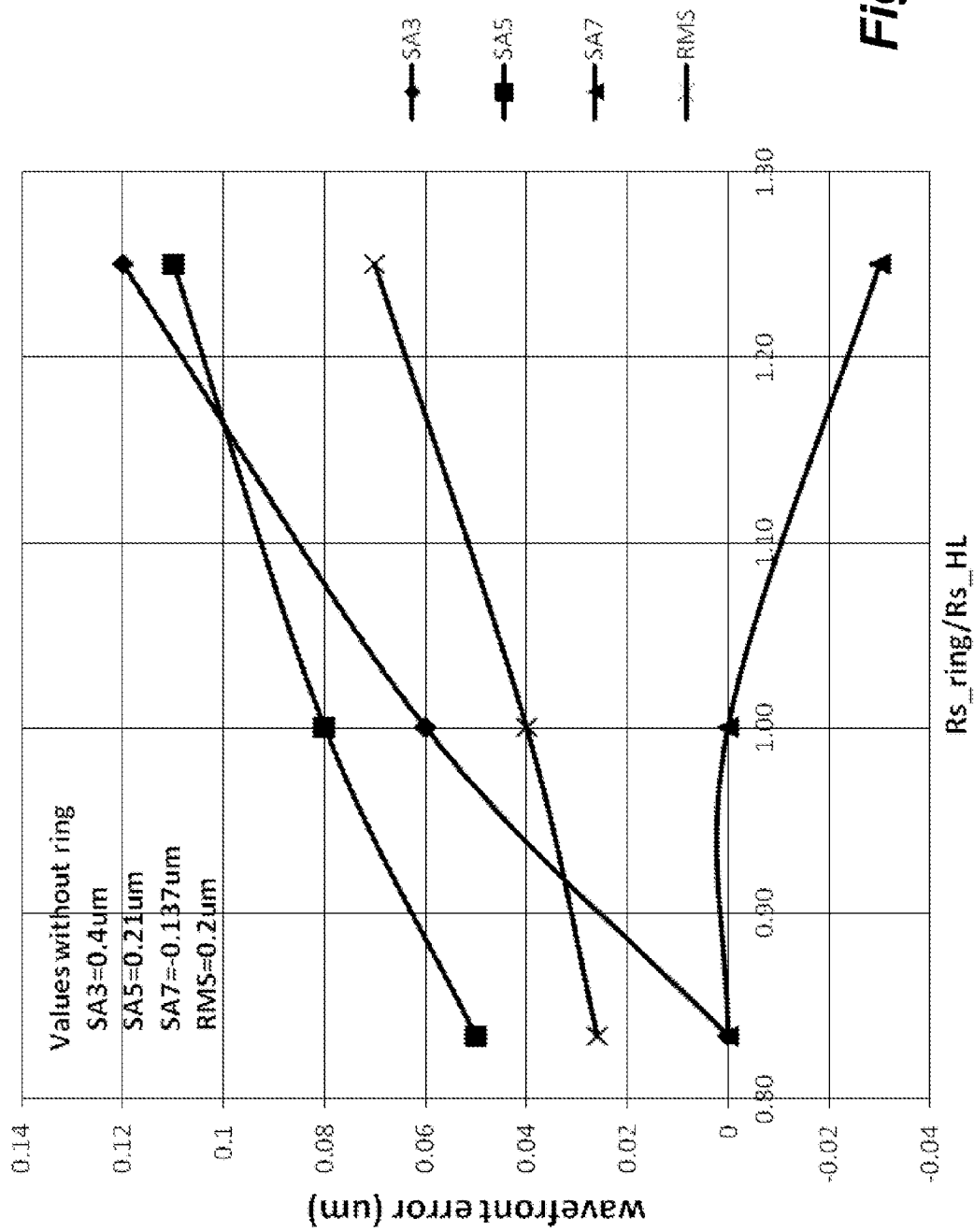
FIG. 25 is a graph illustrating, in accordance with the proposed solution, simulated wavefront circularization aberrations for a half liquid crystal lens geometry illustrated in FIG. 23, wherein similar features bear similar labels throughout the drawings. Reference to "top" and "bottom" qualifiers in the present specification is made solely with reference to the orientation of the drawings as presented in the application and do not imply any absolute spatial orientation.

FIG. 25 illustrates simulated aberrations at 10 D optical power with the second WCL ring on the top of the central WCL layer for a half LC lens geometry illustrated in FIG. 23.

In accordance with other implementations of the proposed solution, a multitude of floating elements including floating electrodes and floating resistive structures each having one of a disc, ring, donut, etc. shapes can be employed to configure a wavefront profile correction.

While some of the liquid crystal cells described above, and illustrated in the drawings, have a single orientation with two cells of orthogonal orientation for polarization independent operation, it will be appreciated that other arrangements are possible. For example, to provide for better angular independence of operation, multiple cells can provide opposed orientation for each polarization. An example of this is a split-cell design illustrated in FIG. 13A of commonly assigned International Patent Application PCT/CA2009/000743, the specification of which is incorporated herein by reference. It is also noted that, while the embodiments described above use unitary ring electrodes, other geometries are also possible, such as a ring electrode that is segmented to provide a tunable adjustment to the voltage and frequency around the circumference of the electrode so that the optical axis and/or shape of the lens can be adjusted/corrected.

While some of the liquid crystal cells described above, and illustrated in the drawings, have an hole-patterned annular ring electrode, the invention is not limited thereto. For example, International PCT Application PCT/CA2010/002023 filed Dec. 23, 2010, which is incorporated herein by reference, describes tunable liquid crystal optical devices, including but not limited to lenses, having a segmented hole-patterned electrode for controlling the electric field across the liquid crystal layer enabling asymmetric phase profiles to be applied for light tilting, optical image stabilization and sub-pixel shift capability. With feedback from an image sensor, such geometry can be used for image stabilization.

The liquid crystal cells described above and illustrated in the drawings relate to lenses and beam steering devices, but other optical devices can also be made using the proposed solution. For example, the liquid crystal material can be mixed with a material having a large anisotropy of absorption (otherwise called "dichroic absorbing" materials) to be controllably oriented to act as a polarization-independent shutter or as a diaphragm device. Differences in absorption coefficients between two orientation states (with respect to the polarization of light) can be orders of magnitude when the material properties, typically the molecule length (namely the aspect ratio) as well its ability to absorb light within the desired spectrum, are well suited. Carbon nanotubes, chains of dichroic dyes, metal or semiconductor nanorods can offer the aspect ratio, absorption properties and stability to be suitable for such applications.

The optical devices illustrated herein can be employed, either in single polarization and/or polarization independent geometry in applications, such as but not limited to: miniature cameras (mobile, cell phone, webcam, tablet, etc.), endoscopic optical elements, intra-ocular devices, Digital Video Disc (DVD)/Blu-Ray™ pick-up systems, etc. ("Blu-Ray" is a trademark of Blu-ray Disc Association).

While the invention has been shown and described with referenced to preferred embodiments thereof, it will be recognized by those skilled in the art that various changes in form and detail may be made therein without departing from the spirit and scope of the invention as defined by the appended claims.

The invention claimed is:

1. A liquid crystal optical device of the type having at least one liquid crystal layer provided between substrates bearing alignment layers, and a hole-patterned electrode arrangement with a weakly conductive material within an aperture of the arrangement to provide a spatially modulated electric field, characterized in that the hole-patterned electrode arrangement is structured to change a phase front in the liquid crystal layer by having:

an electrically floating electrode structure external to the electrode arrangement over the aperture.

2. The device as defined in claim 1, wherein the device is a lens, said aperture is essentially circular, and the floating electrode comprises a conductive disc positioned centrally over the aperture.

3. The device as defined in claim 2, wherein the electrode arrangement is provided on said substrates next to the alignment layers, said conductive disc being located on a side of one of said substrates opposite a ring electrode of said electrode arrangement.

4. The device as defined in claim 1, wherein the device is a lens, said aperture is essentially circular, and includes a spatially non-uniform layer of said weakly conductive material, the spatially non-uniform layer comprises a ring of weakly conductive material within said aperture.

5. The device as defined in claim 4, wherein said ring of weakly conductive material is deposited on a substantially uniform layer of said weakly conductive material.

6. The device as defined in claim 4, wherein the electrode arrangement is provided on said substrates next to the alignment layers.

7. The device as defined in claim 1, wherein the device comprises:

two said liquid crystal layers having alignment layers arranged essentially in orthogonal directions; and at least one weakly conductive layer of said weakly conductive material.

8. The device as defined in claim 1, wherein the device comprises a spatially non-uniform layer of weakly conductive material.

9. A liquid crystal optical device of the type having two liquid crystal layers each provided between substrates bearing alignment layers, and a hole-patterned electrode arrangement with a weakly conductive material within an aperture of the arrangement to provide a spatially modulated electric field, characterized in that the hole-patterned electrode arrangement is structured to change a phase front in each liquid crystal layer by having one or more of:

an electrically floating electrode structure external to the electrode arrangement over the aperture; and two spatially non-uniform weakly conductive layers, each weakly conductive layer corresponding to one of said liquid crystal layers, said weakly conductive layers being one of: in contact with each other and in close proximity to each other.

10. The device as defined in claim 9, wherein the device is a lens, said aperture is essentially circular, and the floating electrode comprises a conductive disc positioned centrally over the aperture.

11. The device as defined in claim 10, wherein the electrode arrangement is provided on said substrates next to the alignment layers, said conductive disc being located on a side of one of said substrates opposite a ring electrode of said electrode arrangement.

12. The device as defined in claim 9, wherein said liquid crystal layers have alignment layers arranged essentially in orthogonal directions.

13. A liquid crystal optical device comprising:
- a first liquid crystal layer acting on a first polarization provided between substrates bearing alignment layers, a first planar electrode, a first hole patterned electrode and at least one first weakly conductive layer located adjacent to said first hole patterned electrode; and
- a second liquid crystal layer acting on a second polarization provided between substrates bearing alignment layers, a second planar electrode, a second hole patterned electrode and at least one second weakly conductive layer located adjacent to said second hole patterned electrode,
- said first weakly conductive layer and said second weakly conductive layer being one of:
  - located in contact with each other; and
  - in close proximity separated by one of:
    - a substrate having a high dielectric constant, and
    - a substrate having a limited conductivity,
  - electric fields generated in said first and second liquid crystal layers by one or more of said electrodes of the device being influenced by an electrical coupling effect between both weakly conductive layers.

14. A device according to claim 13 wherein said first weakly conductive layer and said second weakly conductive layer are in contact with each other and have distinctly different values of one of sheet resistance, conductivity and frequency dependent characteristics.

15. A device according to claim 13 wherein an effect of said first and second weakly conductive layers on at least one of said electric fields is equivalent to an effect of a single third weakly conductive layer with a sheet resistance substantially equal to an average of the two sheet resistances.

16. A device according to claim 13 wherein each said first weakly conductive layer and said second weakly conductive layer located adjacent to said corresponding hole patterned electrode includes one of: said weakly conductive layer in contact with said corresponding hole patterned electrode spaced apart from said corresponding liquid crystal layer, said weakly conductive layer in contact with said corresponding hole patterned electrode while in close proximity with said corresponding liquid crystal layer, and a doped liquid crystal layer.

17. A device according to claim 16 wherein said first and second weakly conductive layers in contact with said corresponding hole patterned electrode each spaced apart from said corresponding liquid crystal layer are directly adjacent to each other.

18. A device according to claim 16 wherein each of said liquid crystal layers has a substrate adjacent one another, said hole-patterned electrodes being located on said substrate to be essentially in contact with one another, and said hole-patterned electrodes include at least one weakly conductive layer in contact with said hole-patterned electrodes.

19. A device according to claim 13 wherein said first and second weakly conductive layers are one of: a decreased ratio between a separation gap distance between said first and second weakly conductive layers and a dielectric constant of a material providing said gap, and located in contact with each other.

20. A device according to claim 13 wherein said first liquid crystal cell and said second liquid crystal cell share a common substrate located between said first liquid crystal layer and said second liquid crystal layer.

21. A device according to claim 20 wherein said first and second weakly conductive layers are each located on said common substrate.

22. A device according to claim 20 wherein said first hole patterned electrode and said second hole patterned electrode are each located on said common substrate.

23. A device according to claim 20 wherein said common substrate comprises a material with a weakly conductive characteristic.

24. A device according to claim 23 wherein said common substrate functions as both said first and second weakly conductive layers.

25. A device according to claim 13 wherein said electric fields generated in said first and second liquid crystal layers have substantially the same value.

26. A device according to claim 20 wherein said common substrate comprises a pair of fabrication substrates bonded together to form said common substrate.

27. A device according to claim 13, wherein at least one hole patterned electrode further comprising a segmented hole-patterned electrode for applying asymmetric phase profiles for light tilting, optical image stabilization and sub-pixel shifting.

* * * * *